(12) United States Patent
Katou et al.

(10) Patent No.: US 8,969,455 B2
(45) Date of Patent: Mar. 3, 2015

(54) METHOD FOR MANUFACTURING RUBBER COMPOSITION

(75) Inventors: Seiichi Katou, Tokyo (JP); Satoshi Horie, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 31 days.

(21) Appl. No.: 13/876,974

(22) PCT Filed: Oct. 3, 2011

(86) PCT No.: PCT/JP2011/072789
§ 371 (c)(1),
(2), (4) Date: Jun. 7, 2013

(87) PCT Pub. No.: WO2012/043853
PCT Pub. Date: Apr. 5, 2012

(65) Prior Publication Data
US 2013/0261242 A1    Oct. 3, 2013

(30) Foreign Application Priority Data

Oct. 1, 2010  (JP) ................................. 2010-224355

(51) Int. Cl.
| C08K 5/09 | (2006.01) |
| C08K 3/36 | (2006.01) |
| C08L 7/00 | (2006.01) |
| C08K 5/31 | (2006.01) |
| C08K 5/44 | (2006.01) |
| C08K 5/47 | (2006.01) |

(52) U.S. Cl.
CPC ... C08K 3/36 (2013.01); C08L 7/00 (2013.01); C08K 5/09 (2013.01); *C08K 5/31* (2013.01); *C08K 5/44* (2013.01); *C08K 5/47* (2013.01)
USPC ....................................... 524/322; 525/332.5

(58) Field of Classification Search
CPC .............. C08K 3/36; C08K 5/09; C08L 9/08; C08L 7/00
USPC ........................................ 524/322; 525/332.5
See application file for complete search history.

(56) References Cited

U.S. PATENT DOCUMENTS

| 6,589,293 B1 | 7/2003 | Guns et al. |
| 2001/0034389 A1 | 10/2001 | Vasseur |
| 2002/0082334 A1 | 6/2002 | Kobayashi et al. |
| 2003/0105242 A1 | 6/2003 | Penot |
| 2003/0144394 A1 | 7/2003 | Penot et al. |
| 2010/0048775 A1* | 2/2010 | Mihara et al. ................... 524/92 |
| 2010/0105805 A1 | 4/2010 | Sasaka |

FOREIGN PATENT DOCUMENTS

| CN | 1539872 A | 10/2004 |
| JP | 06107856 A | 4/1994 |
| JP | 7-165991 A | 6/1995 |
| JP | 11-263882 A | 9/1999 |
| JP | 2002-521516 A | 7/2002 |
| JP | 2002-521525 A | 7/2002 |
| JP | 2002201309 A | 7/2002 |
| JP | 2003-523472 A | 8/2003 |
| JP | 2003-530443 A | 10/2003 |
| WO | 96/30419 A1 | 10/1996 |
| WO | 2008/102513 A1 | 8/2008 |
| WO | 2008/123306 A1 | 10/2008 |

OTHER PUBLICATIONS

International Search Report for PCT/JP2011/072789 dated Dec. 6, 2011.
Office Action issued Jun. 24, 2014 in corresponding Chinese Patent Application No. 201180052603.0.

* cited by examiner

Primary Examiner — Kuo-Liang Peng
(74) Attorney, Agent, or Firm — Sughrue Mion, PLLC

(57) ABSTRACT

The present invention is a method for producing a rubber composition containing a rubber component (A) of at least one selected from natural rubbers and synthetic dienic rubbers, a filler containing an inorganic filler (B), a silane coupling agent (C), at least one vulcanization accelerator (D) selected from guanidines, sulfenamides and thiazoles, and an organic acid compound (E), wherein the rubber composition is kneaded in plural stages, the rubber component (A), all or a part of the inorganic filler (B), all or a part of the silane coupling agent (C), the vulcanization accelerator (D) and the organic acid compound (E) are kneaded in the first stage of kneading, and the number of molecules X of the organic acid compound (E) in the rubber composition in the first stage is in a relation of the following formula [1] relative to the number of molecules Y of the vulcanization accelerator (D) therein. The production method enables production of a rubber composition having a low-heat-generation property while successfully preventing the coupling function activity of the silane coupling agent from lowering.

$$0 \leq X \leq 1.5 \times Y \qquad [1]$$

19 Claims, 1 Drawing Sheet

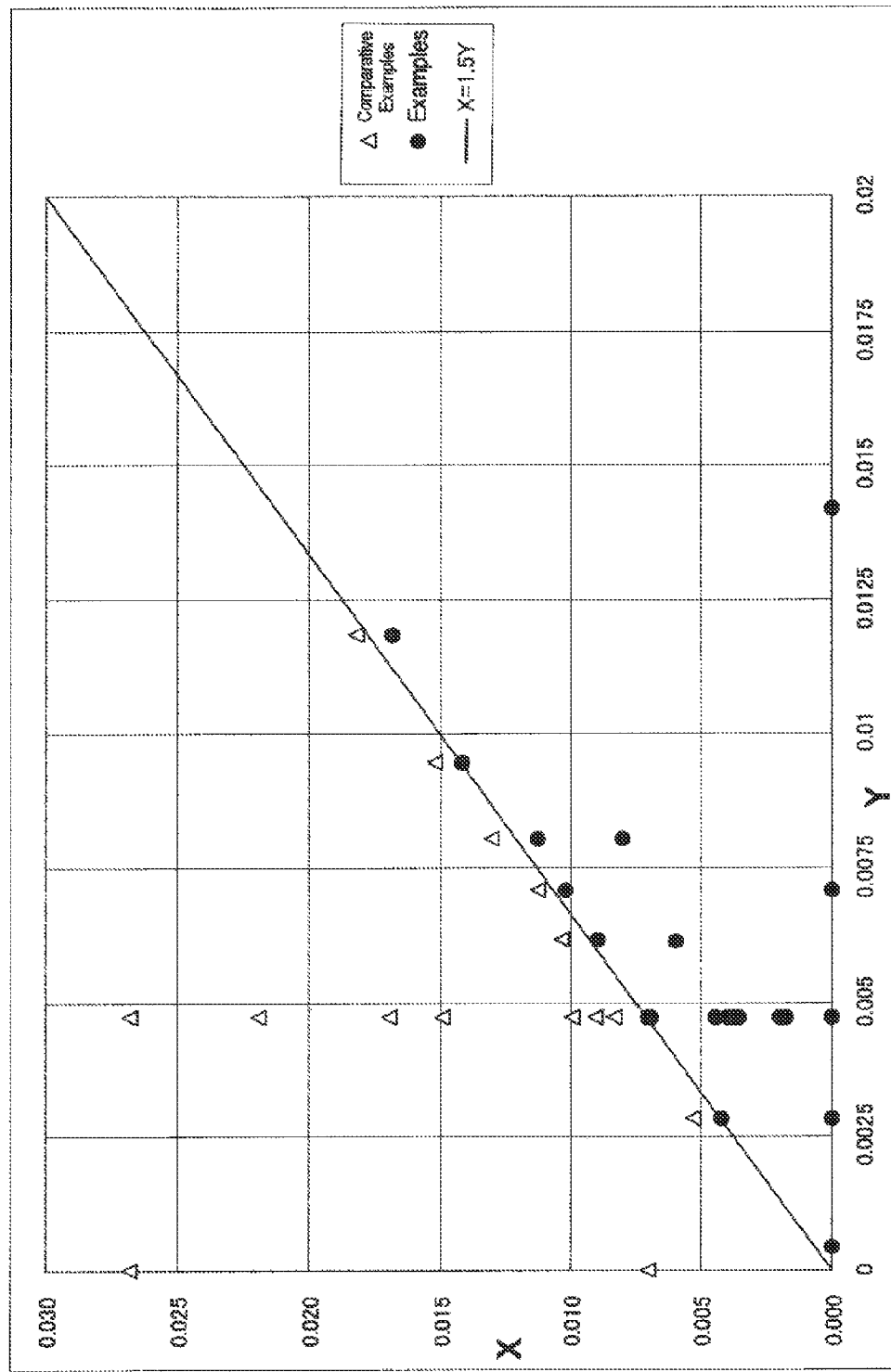

METHOD FOR MANUFACTURING RUBBER COMPOSITION

CROSS REFERENCE TO RELATED APPLICATIONS

This application is a National Stage of International Application No. PCT/JP2011/072789 filed Oct. 3, 2011, claiming priority based on Japanese Patent Application No. 2010-224355 filed Oct. 1, 2010, the contents of all of which are incorporated herein by reference in their entirety.

TECHNICAL FIELD

The present invention relates to a method for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of sing an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, Patent Reference 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

Patent Reference 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

Patent Reference 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, Patent Reference 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

As a case of increasing the activity of the coupling function of a silane coupling agent in consideration of kneading conditions, there is mentioned Patent Reference 5, in which, however, nothing is taken into consideration relating to the fact that the effect of increasing the activity of the coupling function of a silane coupling agent may be lowered by some additives.

CITATION LIST

Patent References

Patent Reference 1: JP-T 2002-521515
Patent Reference 2: JP-T 2002-521516
Patent Reference 3: JP-T 2003-530443
Patent Reference 4: JP-T 2003-523472
Patent Reference 5: WO2008/123306

SUMMARY OF THE INVENTION

Problems that the Invention is to Solve

Given the situation as above, an object of the present invention is to provide a method for producing a rubber composition capable of successfully inhibiting the reduction in the activity of the coupling function of a silane coupling agent and further increasing the activity of the coupling function thereof to thereby successfully produce a low-heat-generating rubber composition.

Means for Solving the Problems

For solving the above-mentioned problems, the present inventors have made various experiments of mixing a rubber component, all or a part of an inorganic filler, all or a part of a silane coupling agent, and at least one vulcanization accelerator selected from guanidines, sulfenamides and thiazoles in the first stage of a kneading step, and, as a result, have found that, when at least one vulcanization accelerator selected from guanidines, sulfenamides and thiazoles is added to the system, the effect of increasing the activity of the coupling reaction is high in some cases but is low in some other cases. With that, the present inventors have variously and experimentally analyzed the factors of increasing the effect and, as a result, have obtained an experimental finding that, in order to increase the activity of coupling function, the mixing amount of the organic acid compound and the mixing amount of at least one vulcanization accelerator selected from guanidines, sulfenamides and thiazoles are to be in a specific relationship. We, the present inventors have plotted a part of our experiments on a graph and derived the following formula [1] that is a critical recursion formula from the graph, and have completed the present invention. FIG. 1 shows the critical recursion formula [1] obtained in the present invention.

Specifically, the present invention is a method for producing a rubber composition containing a rubber component (A) of at least one selected from natural rubbers and synthetic dienic rubbers, a filler containing an inorganic filler (B), a silane coupling agent (C), at least one vulcanization accelerator (D) selected from guanidines, sulfenamides and thiazoles, and an organic acid compound (E), wherein the rubber composition is kneaded in plural stages, the rubber component (A), all or a part of the inorganic filler (B), all or a part of the silane coupling agent (C), the vulcanization accelerator (D) and the organic acid compound (E) are kneaded in the first stage of kneading, and the number of molecules X of the organic acid compound (E) in the rubber composition in the first stage is in a relation of the following formula [1] relative to the number of molecules Y of the vulcanization accelerator (D) therein:

$$0 \leq X \leq 1.5 \times Y \quad [1]$$

Advantage of the Invention

According to the present invention, there is provided a method for producing a rubber composition capable of successfully inhibiting the reduction in the activity of the coupling function of a silane coupling agent and further increasing the activity of the coupling function thereof to produce a rubber composition excellent in low-heat-generation property.

BRIEF DESCRIPTION OF DRAWING

FIG. 1 This is a graph showing the critical recursion formula [1] in the present invention. X represents the number of molecules of the organic acid compound (E) in the rubber composition in the first stage, and Y represents the number of molecules of the vulcanization accelerator (D) in the rubber composition therein.

MODE FOR CARRYING OUT THE INVENTION

The present invention is described in detail hereinunder.

The method for producing a rubber composition of the present invention is a method for producing a rubber composition containing a rubber component (A) of at least one selected from natural rubbers and synthetic dienic rubbers, a filler containing an inorganic filler (B), a silane coupling agent (C), at least one vulcanization accelerator (D) selected from guanidines, sulfenamides and thiazoles, and an organic acid compound (E), wherein the rubber composition is kneaded in plural stages, the rubber component (A), all or a part of the inorganic filler (B), all or a part of the silane coupling agent (C), the vulcanization accelerator (D) and the organic acid compound (E) are kneaded in the first stage of kneading, and the number of molecules X of the organic acid compound (E) in the rubber composition in the first stage is in a relation of the following formula [1] relative to the number of molecules Y of the vulcanization accelerator (D) therein:

$$0 \leq X \leq 1.5 \times Y \quad [1]$$

In the present invention, the reason why the vulcanization accelerator (D) is added and kneaded in the first stage of kneading is for increasing the activity of the coupling function of the silane coupling agent (C), and the reason why the number of molecules (molar number) X of the organic acid compound (E) in the rubber composition in the first stage is at most 1.5 times the number of molecules (molar number) Y of the vulcanization accelerator (D) therein is for successfully inhibiting the effect of enhancing the activity of coupling function from being lowered by incorporation of the vulcanization accelerator (D).

In the above-mentioned formula [1], X=0 means that the organic compound (E) is not incorporated. In other words, in the first stage of kneading in the present invention, the organic acid compound (E) is not always required to be added.

For more successfully increasing the activity of the coupling function of the silane coupling agent (C), preferably, the highest temperature of the rubber composition in the first stage of kneading is from 120 to 190° C., more preferably from 130 to 175° C., even more preferably from 140 to 170° C.

In case where the vulcanization accelerator (D) is added after the rubber component (A), all or a part of the inorganic filler (B) and all or a part of the silane coupling agent (C) are kneaded, and these are further kneaded in the first stage of kneading in the present invention, the time to be taken before the vulcanization accelerator (D) is added on the way of the first stage of kneading after the rubber component (A), all or a part of the inorganic filler (B) and all or a part of the silane coupling agent (C) are added in the first stage of kneading is preferably from 10 to 180 seconds. The time is more preferably from 10 to 150 seconds, even more preferably from 30 to 150 seconds, still more preferably from 30 to 120 seconds.

When the time is at least 10 seconds, then the reaction of (B) and (C) can fully go on. Even when the time is more than 180 seconds, the reaction of (B) and (C) would have already fully gone on, and any additional effect could no more be expected; and therefore, the upper limit is preferably 180 seconds.

The kneading step for the rubber composition in the present invention includes at least two stages of the first stage of kneading the others than vulcanization-related chemicals except the vulcanization accelerator (D) and the final stage of kneading those including vulcanization-related chemicals, and may optionally include an intermediate stage of kneading the others than vulcanization-related chemicals except the vulcanization accelerator (D). Here the vulcanization-related chemicals are chemicals relevant to vulcanization concretely including a vulcanizing agent and a vulcanization accelerator.

The first stage of kneading in the present invention is the first stage of kneading the rubber component (A), the inorganic filler (B) and the silane coupling agent (C), but does not include a case of kneading the rubber component (A) and the other filler than the inorganic filler (B) in the initial stage and a case of pre-kneading the rubber component (A) alone.

In the present invention, the kneading stage before the final stage such as the first stage, the intermediate stage and others is a step of mixing the other starting materials than vulcanization-related chemicals (vulcanizing agent and vulcanization accelerator), such as the rubber component, the inorganic filler, the coupling agent and others and kneading them, and this is a step of dispersing the inorganic filler in the rubber composition and reinforcing the rubber component. One characteristic feature of the present invention is that the vulcanization accelerator (D) is incorporated in the first stage to thereby better the dispersion of the inorganic filler in the rubber composition. As the case may be, the rubber component, the filler and others may be incorporated and kneaded in the intermediate stage.

In case where the method of the present invention includes an intermediate stage after the first stage of kneading and before the final stage, preferably, the highest temperature of the rubber composition in the intermediate kneading stage is from 120 to 190° C., more preferably from 130 to 175° C., even more preferably from 140 to 170° C. The kneading time is preferably from 10 seconds to 20 minutes, more preferably from 10 seconds to 10 minutes, even more preferably from 30 seconds to 5 minutes. When the method includes the intermediate stage, it is desirable that after the first kneading stage, the temperature of the rubber composition is lowered by at least 10° C. than the temperature thereof after the kneading of the first stage and thereafter the composition is processed in the subsequent stage.

The final stage of kneading is a step of incorporating vulcanization-related chemicals (vulcanizing agent, vulcanization accelerator) and kneading the ingredients. Preferably, the highest temperature of the rubber composition in the final stage is from 60 to 140° C., more preferably from 80 to 120° C., even more preferably from 100 to 120° C. The kneading time is preferably from 10 seconds to 20 minutes, more preferably from 10 seconds to 10 minutes, even more preferably from 20 seconds to 5 minutes.

When the rubber composition is processed sequentially from the first kneading stage, the intermediate stage to the final stage, it is desirable that the temperature of the rubber composition is lowered by at least 10° C. than the temperature thereof after the first kneading stage and thereafter the composition is processed in the subsequent stage.

[Silane Coupling Agent (C)]

The silane coupling agent (C) for use in the rubber composition production method of the present invention is preferably at least one compound selected from a group consisting of compounds of the following general formulae (I) and (II).

Using the silane coupling agent (C) of the type, the rubber composition in the present invention is excellent in workability thereof and can give pneumatic tires having good abrasion resistance.

General formulae (I) and (II) are sequentially described below.

[Chemical Formula 1]

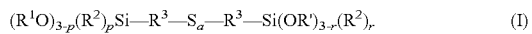
(I)

wherein plural $R^1$'s may be the same or different, each representing a linear, cyclic or branched alkyl group having from 1 to 8 carbon atoms, a linear or branched alkoxyalkyl group having from 2 to 8 carbon atoms, or a hydrogen atom; plural $R^2$'s may be the same or different, each representing a linear, cyclic or branched alkyl group having from 1 to 8 carbon atoms; plural $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chemical Formula 2]

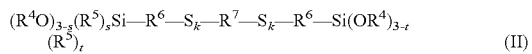
(II)

wherein plural $R^4$'s may be the same or different, each representing a linear, cyclic or branched alkyl group having from 1 to 8 carbon atoms, a linear or branched alkoxylalkyl group having from 2 to 8 carbon atoms, or a hydrogen atom; plural $R^5$'s may be the same or different, each representing a linear, cyclic or branched alkyl group having from 1 to 8 carbon atoms; plural $R^6$'s may be the same or different, each representing a linear or branched alkylene group having from 1 to 8 carbon atoms; $R^7$ represents a divalent group of a general formula (—S—$R^8$—S—), (—$R^9$—$S_{m1}$—$R^{10}$—) or (—$R^{11}$—$S_{m2}$—$R^{12}$—$S_{m3}$—$R^{13}$—) (where $R^8$ to $R^{13}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); plural k's may be the same or different, each indicating from 1 to 6 as a mean value; s and t each indicate from 0 to 3 as a mean value, provided that both s and t are not 3 at the same time.

Preferred examples of the silane coupling agent (C) represented by the above-mentioned general formula (II) are compounds represented by an average compositional formula

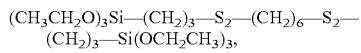

an average compositional formula

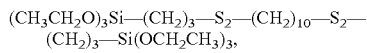

an average compositional formula

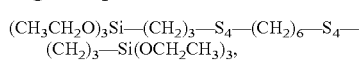

an average compositional formula

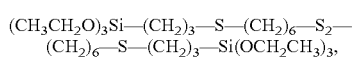

an average compositional formula

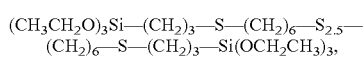

an average compositional formula

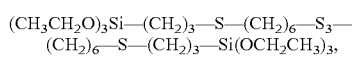

an average compositional formula

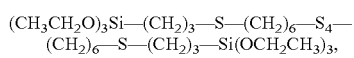

an average compositional formula

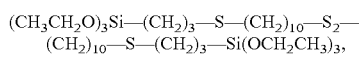

an average compositional formula

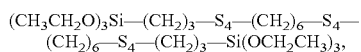

an average compositional formula

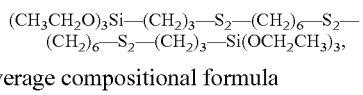

an average compositional formula $(CH_3CH_2O)_3Si—(CH_2)_3—S—(CH_2)_6—S_2—(CH_2)_6—S_2—(CH_2)_6—S—(CH_2)_3—Si (OCH_2CH_3)_3$, etc.

Of the compounds represented by the general formulae (I) and (II), those of the general formula (I) are especially preferred as the silane coupling agent (C) for use in the present invention. The vulcanization accelerator (D) can readily activate the polysulfide bond that reacts with the rubber component (A).

In the present invention, one alone or two or more different types of the silane coupling agents (C) may be used either singly or as combined.

Regarding the amount of the silane coupling agent (C) to be in the rubber composition in the present invention, preferably, the ratio by mass of {silane coupling agent (C)/inorganic filler (B)} is from (1/100) to (20/100). When the ratio is at least (1/100), then the effect of enhancing the low-heat-generation property of the rubber composition can be more successfully exhibited; and when at most (20/100), the cost of the rubber composition is low and the economic potential thereof increases. Further, the ratio by mass is more preferably from (3/100) to (20/100), even more preferably from (4/100) to (10/100).

[Vulcanization Accelerator (D)]

The vulcanization accelerator (D) for use in the rubber composition production method of the present invention includes guanidines, sulfenamides and thiazoles.

The guanidines include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, 1,3-di-o-cumenyl-2-propionylguanidine, etc. Preferred are 1,3-diphenylguanidine, 1,3-di-o-tolylguanidine and 1-o-tolylbiguanide as having high reactivity; and more preferred is 1,3-diphenylguanidine as the reactivity thereof is higher.

The sulfenamides include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulenamide, N,N-dimethyl-2-benzothiazolylsulenamide, N,N-diethyl-2-benzothiazolylsulenamide, N,N-dipropyl-2-benzothiazolylsulenamide, N,N-dibutyl-2-benzothiazolylsulenamide, N,N-dipentyl-2-benzothiazolylsulenamide, N,N-dihexyl-2-benzothiazolylsulenamide, N,N-dipentyl-2-benzothiazolylsulenamide, N,N-dioctyl-2-benzothiazolylsulenamide, N,N-di-2-ethylhexylbenzothiazolylsulfenamide, N-decyl-2-benzothiazolylsulenamide, N,N-didodecyl-2-benzothiazolylsulenamide, N,N-distearyl-2-benzothiazolylsulenamide, etc. Of those, preferred are N-cyclohexyl-2-benzothiazolylsulenamide and N-tert-butyl-2-benzothiazolylsulenamide, as having high reactivity.

The thiazoles include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole, etc. Of those, preferred are 2-mercaptobenzothiazole and di-2-benzothiazolyl disulfide, as having high reactivity.

In the first stage of kneading in the present invention, preferably, the number of molecules (molar number) of the vulcanization accelerator (D) is from 0.1 to 1.0 time the number of molecules (molar number) of the silane coupling agent (C). When the molar number is at least 0.1 times, then the silane coupling agent (C) can be fully activated; and when at most 1.0 time, then the agent would not have any significant influence on the vulcanization speed. More preferably, the number of molecules (molar number) of the vulcanization accelerator (D) is from 0.3 to 1.0 time the number of molecules (molar number) of the silane coupling agent (C), even more preferably from 0.4 to 1.0 time.

Regarding the method of putting the vulcanization accelerator (D) into the system in the first stage, preferably, the rubber component (A), all or apart of the inorganic filler (B) and all or a part of the silane coupling agent (C) are kneaded and then the vulcanization accelerator (D) is added thereto and further kneaded. According to the putting method, the silane coupling agent (C) can well react with the rubber component (A) after the silane coupling gent (C) has fully reacted with silica.

The vulcanization accelerator (D) may act also as a promoter for sulfur vulcanization, and if desired, a suitable amount thereof may be incorporated also in the final stage of kneading. In case where a vulcanization accelerator is incorporated in the final stage of kneading, the agent is not limited to the vulcanization accelerator (D) of the present invention but may be any known vulcanization accelerator.

[Organic Acid Compound (E)]

The organic acid compound (C) in the present invention includes organic acids, for example, saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linolic acid, linolenic acid, nervonic acid, etc.; as well as resin acids such as rosin acid, modified rosin acid, etc.; and esters of the above-mentioned saturated fatty acids, unsaturated fatty acids and resin acids, etc.

In the present invention, preferably, at least 50 mol % of the organic acid compound (E) in the rubber composition in the first stage of kneading is stearic acid, in order that the vulcanization accelerator must fully exhibit its function.

In case where the rubber component (A) contains at least one selected from emulsion-polymerized styrene-butadiene copolymer and natural rubber, preferably, at least 50 mol % of the organic acid compound (E) in the rubber composition in the first stage of kneading is at least one compound selected from rosin acids and fatty acids contained in at least one selected from the emulsion-polymerized styrene-butadiene copolymer and the natural rubber. The rosin acids (including modified rosin acids) and fatty acids contained in an emulsion-polymerized styrene-butadiene copolymer are derived from the emulsifying agent necessary for producing the emulsion-polymerized styrene-butadiene copolymer. Natural rubbers generally contain a small amount of fatty acids.

[Rubber Component (A)]

As the synthetic dienic rubber of the rubber component (A) for use in the rubber composition production method of the present invention, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One or more different types of natural rubbers and synthetic dienic rubbers may be used here either singly or as combined.

As the inorganic filler (B) for use in the rubber composition production method of the present invention, usable are silica and an inorganic compound represented by the following general formula (III):

$$dM^1 \cdot xSiO_y \cdot zH_2O \quad\quad (III)$$

In the general formula (III), $M^1$ represents at least one selected from, a metal selected from aluminium, magnesium, titanium, calcium and zirconium, and oxides or hydroxides of those metals, their hydrates, or carbonates of the metals; d, x, y and z each indicate an integer of from 1 to 5, an integer of from 0 to 10, an integer of from 2 to 5, and an integer of from 0 to 10, respectively.

In the general formula (III), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable here; and above all, preferred is precipitated silica, fumed silica or colloidal silica, and more preferred is precipitated silica. Preferably, the BET specific surface area (as measured according to ISO 5794/1) of silica for use herein is from 40 to 350 $m^2/g$. Silica of which the BET specific surface area falls within the range is advantageous in that it satisfies both rubber-reinforcing capability and dispersibility in rubber component. From this viewpoint, silica of which the BET specific surface area falls within a range of from 80 to 350 $m^2/g$ is more preferred; silica of which the BET specific surface area falls within a range of more than 130 $m^2/g$ to 350 $m^2/g$ is even more preferred; and silica of which the BET specific surface area falls within a range of from 135 to 350 $m^2/g$ is even more preferred. As silicas of those types, usable here are commercial products of Tosoh Silica's trade names "Nipsil AQ" (BET specific surface area=205 $m^2/g$) and "Nipsil KQ" (BET specific surface area=240 $M^2/g$); Degussa's trade name "Ultrasil VN3" (BET specific surface area=175 $m^2/g$), etc.

As the inorganic compound represented by the general formula (III), usable here are alumina ($Al_2O_3$) such as γ-alumina, α-alumina, etc.; alumina monohydrate ($Al_2O_3 \cdot H_2O$) such as boehmite, diaspore, etc.; aluminium hydroxide [Al(OH)$_3$] such as gypsite, bayerite, etc.; aluminium carbonate [$Al_2(CO_3)_2$], magnesium hydroxide [Mg(OH)$_2$], magnesium oxide (MgO), magnesium carbonate (MgCO$_3$), talc (3MgO·4SiO$_2$·H$_2$O), attapulgite (5MgO·8SiO$_2$·9H$_2$O), titanium white (TiO$_2$), titanium black (TiO$_{2n-1}$), calcium oxide (CaO), calcium hydroxide [Ca(OH)$_2$], aluminium magnesium oxide (MgO·Al$_2$O$_3$), clay (Al$_2$O$_3$·2SiO$_2$), kaolin (Al$_2$O$_3$·2SiO$_2$·2H$_2$O), pyrophyllite (Al$_2$O$_3$·4SiO$_2$·H$_2$O), bentonite (Al$_2$O$_3$·4SiO$_2$·2H$_2$O), aluminium silicate (Al$_2$SiO$_5$, Al$_4$·3SiO$_4$·5H$_2$O, etc.), magnesium silicate (Mg$_2$SiO$_4$, MgSiO$_3$, etc.), calcium silicate (Ca$_2$·SiO$_4$, etc.), aluminium calcium silicate (Al$_2$O$_3$·CaO·2SiO$_2$, etc.), magnesium calcium silicate (CaMgSiO$_4$), calcium carbonate (CaCO$_3$), zirconium oxide (ZrO$_2$), zirconium hydroxide [ZrO(OH)$_2$·nH$_2$O], zirconium carbonate [Zr(CO$_3$)$_2$]; as well as crystalline aluminosilicate salts containing a charge-correcting hydrogen, alkali metal or alkaline earth metal such as various types of zeolite. Preferably, $M^1$ in the general formula (III) is at least one selected from aluminium metal, aluminium oxide or hydroxide, and their hydrates, or aluminium carbonate.

One or more different types of the inorganic compounds of the general formula (III) may be used here either singly or as combined. The mean particle size of the inorganic compound is preferably within a range of from 0.01 to 10 μm from the viewpoint of the balance of kneading workability, abrasion resistance and wet grip performance, and more preferably within a range of from 0.05 to 5 μm.

As the inorganic filler (B) in the present invention, silica alone may be used, or silica as combined with at least one inorganic compound of the general formula (III) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area (N$_2$SA, as measured according to JIS K 6217-2:2001) of such carbon black is from 30 to 250 $m^2/g$. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of reducing rolling resistance. Further, the amount is more preferably from 30 to 100 parts by mass.

Also preferably, the filler in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of reducing rolling resistance.

In the filler, preferably, the amount of the inorganic filler (B) is at least 30% by mass from the viewpoint of satisfying both wet performance and reduced rolling resistance, more preferably at least 40% by mass, and even more preferably at least 70% by mass.

In case where silica is used as the inorganic filler (B), it is desirable that silica accounts for at least 30% by mass of the filler, more preferably at least 35% by mass.

In the rubber composition production method of the present invention, various additives that are generally incorporated in a rubber composition, for example, a vulcanization activator such as zinc flower or the like, an antioxidant and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, a kneader, a double-screw extruder, etc.

EXAMPLES

The present invention is described in more detail with reference to the following Examples; however, the present invention is not limited at all by the following Examples.

Low-heat-generating property (tan δ index) was evaluated according to the following method.

Low-Heat-Generation Property (tan δ index)

Using a viscoelasticity measuring device (by Rheometric), tan δ of the rubber composition sample was measured at a temperature of 60° C., at a dynamic strain of 5% and at a frequency of 15 Hz. Taking the reciprocal of tan δ in Comparative Example 1, 19, 46, 54, 62 or 70 as 100, the data were expressed as index indication according to the following formula. The samples having a larger index value have a better low-heat-generation property and have a smaller hysteresis loss.

Low-Heat-Generation Index={(tan δ of vulcanized rubber composition of Comparative Example 1, 19, 46, 54, 62 or 70)/(tan δ of vulcanized rubber composition tested)}×100

Production Example 1

Production of Silane Coupling Agent Represented by Average Compositional Formula

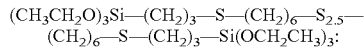
$(CH_3CH_2O)_3Si-(CH_2)_3-S-(CH_2)_6-S_{2.5}-(CH_2)_6-S-(CH_2)_3-Si(OCH_2CH_3)_3$:

119 g (0.5 mol) of 3-mercaptopropyltriethoxysilane was put into a 2-liter separable flask equipped with a nitrogen-introducing duct, a thermometer, a Dimroth condenser and a dropping funnel, and with stirring, 151.2 g (0.45 mol) of an ethanol solution of sodium ethoxide having an effective ingredient concentration of 20% by mass was added thereto. Subsequently, this was heated up to 80° C. and stirred for 3 hours. Afterwards, this was cooled and transferred into a dropping funnel.

Next, 69.75 g (0.45 mol) of 1,6-dichlorohexane was put into a separable flask similar to the above, heated up to 80° C., and the reaction product of 3-mercaptopropyltriethoxysilane and sodium ethoxide was slowly and dropwise added thereto. After the addition, this was stirred for 5 hours at 80° C. Subsequently, this was cooled, and salt was separated from the obtained solution through filtration, and ethanol and excessive 1,6-dichlorohexane were removed therefrom through reduced-pressure distillation. The obtained solution was distilled under reduced pressure to give 137.7 g of a colorless transparent liquid having a boiling point of 148 to 150° C./0.005 Torr (0.67 Pa). As a result of IR analysis, $^1$H-NMR analysis and mass spectrometry analysis (MS analysis), the product was a compound represented by $(CH_3CH_2O)_3Si-(CH_2)_3S-(CH_2)_6-Cl$. Through gas chromatography analysis (GC analysis), the purity of the compound was 97.5%.

Next, 80 g of ethanol, 5.46 g (0.07 mol) of anhydrous sodium sulfide and 3.36 g (0.105 mol) of sulfur were put into the same 0.5-liter separable flask as above, and heated up to 80° C. With stirring the solution, 49.91 g (0.14 mol) of the above $(CH_3CH_2O)_3Si-(CH_2)_3-S-(CH_2)_6-Cl$ was gradually and dropwise added thereto. After the addition, this was stirred for 10 hours at 80° C. After the stirring, this was cooled, the formed salt was taken out through filtration, and then the solvent ethanol was evaporated away under reduced pressure.

The obtained, red-brown transparent solution was analyzed through IR analysis, $^1$H-NMR analysis and ultra-critical chromatography analysis, which confirmed that the product is a compound represented by an average compositional formula,

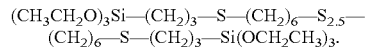
$(CH_3CH_2O)_3Si-(CH_2)_3-S-(CH_2)_6-S_{2.5}-(CH_2)_6-S-(CH_2)_3-Si(OCH_2CH_3)_3$.

In GPC analysis, the purity of the product was 85.2%.

Examples 1 to 22 and Comparative Examples 1 to 15

According to the compositional formulation and the kneading method shown in Table 1, the ingredients were kneaded in a Banbury mixer in such a controlled manner that the highest temperature of the rubber composition in the first stage of kneading could be 150° C., thereby preparing 37 types of rubber compositions. In the first stage of kneading all the rubber compositions except Comparative Examples 1 and 2, the rubber component (A), all the inorganic filler (B) and all the silane coupling agent (C) were kneaded, and then the vulcanization accelerator of 1,3-diphenylguanidine, a type of guanidine was added thereto and further kneaded. The obtained 37 rubber compositions were evaluated in point of the low-heat-generation property (tan δ index) thereof according to the above-mentioned method. The results are shown in Table 1.

TABLE 1

| Formulation | | | Example | | | | | | | | | | | | | |
|---|---|---|---|---|---|---|---|---|---|---|---|---|---|---|---|---|
| | | Part by mass | 1 | 2 | 3 | 4 | 5 | 6 | 7 | 8 | 9 | 10 | 11 | 12 | 13 | 14 |
| | First Stage of Kneading | Emulsion-Polymerized SBR *1 | 100 | — | — | — | — | — | — | — | — | 20 | 30 | 40 | 10 | 10 |
| | | Solution-Polymerized SBR *2 | — | 100 | 100 | 100 | 100 | 100 | 100 | 100 | 90 | 80 | 70 | 60 | 90 | 90 |
| | | Carbon Black N220 *3 | 10 | 10 | 10 | 10 | 10 | 10 | 10 | 10 | 10 | 10 | 10 | 10 | 10 | 10 |
| | | Silica *4 | 50 | 50 | 50 | 50 | 50 | 50 | 50 | 50 | 50 | 50 | 50 | 60 | 50 | 50 |
| | | Silane Coupling Agent Si75 *5 | 4 | 4 | 4 | 4 | 4 | 4 | 4 | 4 | 4 | 4 | 4 | 4.8 | 4 | 4 |
| | | Aromatic Oil | 30 | 30 | 30 | 30 | 30 | 30 | 30 | 30 | 30 | 30 | 30 | 30 | 30 | 30 |
| | | Stearic Acid | — | — | — | — | — | — | 1 | 0.5 | — | — | — | — | 0.5 | 0.7 |
| | | Antioxidant 6PPD *6 | — | — | — | — | — | — | — | 1 | — | — | — | — | 1 | 1 |
| | | 1,3-Diphenylguanidine *7 | 1 | 0.6 | 0.1 | 1.5 | 3 | 1 | 1 | 1 | 1 | 1 | 1.3 | 1.7 | 1 | 1 |
| | Final Stage of Kneading | Stearic Acid | 2 | 2 | 2 | 2 | 2 | 1 | 1 | 1.5 | 2 | 2 | 2 | 2 | 1.5 | 1.3 |
| | | Antioxidant 6PPD *6 | 1 | 1 | 1 | 1 | 1 | 1 | 1 | — | 1 | 1 | 1 | 1 | 1 | 1 |
| | | Antioxidant TMDQ *8 | 1 | 1 | 1 | 1 | 1 | 1 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Number of Molecules of Organic Acid Compound in First Stage of Kneading (mol) | | | — | — | — | — | — | 3.5 × 10⁻³ | 3.5 × 10⁻³ | 1.8 × 10⁻³ | 2.0 × 10⁻³ | 4.0 × 10⁻³ | 6.0 × 10⁻³ | 7.9 × 10⁻³ | 3.7 × 10⁻³ | 4.4 × 10⁻³ |
| Number of Molecules of Guanidine in First Stage of Kneading (mol) | | | 4.7 × 10⁻³ | 2.8 × 10⁻³ | 4.7 × 10⁻⁴ | 7.1 × 10⁻³ | 1.4 × 10⁻² | 4.7 × 10⁻³ | 4.7 × 10⁻³ | 4.7 × 10⁻³ | 4.7 × 10⁻³ | 4.7 × 10⁻³ | 6.2 × 10⁻³ | 8.1 × 10⁻³ | 4.7 × 10⁻³ | 4.7 × 10⁻³ |
| Number of Molecules of Silane Coupling Agent in First Stage of Kneading (mol) | | | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 9.8 × 10⁻³ | 8.2 × 10⁻³ | 8.2 × 10⁻³ |
| Vulcanizate Physical Property | | Low-Heat-Generation Property (tanδ index) | 128 | 125 | 118 | 126 | 122 | 120 | 119 | 122 | 119 | 118 | 117 | 117 | 118 | 117 |

| Formulation | | | Comparative Example | | | | | | | | |
|---|---|---|---|---|---|---|---|---|---|---|---|
| | | Part by mass | 1 | 2 | 3 | 4 | 5 | 6 | 7 | 8 | |
| | First Stage of Kneading | Emulsion-Polymerized SBR *1 | 100 | — | 100 | 10 | 50 | 75 | 50 | 75 | |
| | | Solution-Polymerized SBR *2 | — | 100 | — | 90 | 50 | 25 | 50 | 25 | |
| | | Carbon Black N220 *3 | 10 | 10 | 10 | 10 | 10 | 10 | 10 | 10 | |
| | | Silica *4 | 50 | 50 | 50 | 50 | 50 | 50 | 50 | 50 | |
| | | Silane Coupling Agent Si75 *5 | 4 | — | 4 | 4 | 4 | 4 | 4 | 4 | |
| | | Aromatic Oil | 30 | 30 | 30 | 30 | 30 | 30 | 30 | 30 | |
| | | Stearic Acid | 2 | 2 | 2 | 2 | 2 | 2 | — | — | |
| | | Antioxidant 6PPD *6 | 1 | 1 | 1 | 1 | 1 | — | — | — | |
| | | 1,3-Diphenylguanidine *7 | — | — | 1 | 1 | 1 | — | 1 | 1 | |
| | Final Stage of Kneading | Stearic Acid | — | — | — | — | — | — | 2 | 2 | |
| | | Antioxidant 6PPD *6 | — | — | — | — | — | — | 1 | 1 | |
| | | Antioxidant TMDQ *8 | 1 | 1 | 1 | 1 | 1 | 1 | 1 | 1 | |
| | | Zinc Flower | 2.5 | 2.5 | 2.5 | 2.5 | 2.5 | 2.5 | 2.5 | 2.5 | |
| | | 1,3-Diphenylguanidine *7 | 0.6 | 0.6 | 0.6 | 0.6 | 0.6 | 0.6 | 0.6 | 0.6 | |
| | | Vulcanization Accelerator MBTS *9 | 1 | 1 | 1 | 1 | 1 | 1 | 1 | 1 | |
| | | Vulcanization Accelerator TBBS *10 | 0.6 | 0.6 | 0.6 | 0.6 | 0.6 | 0.6 | 0.6 | 0.6 | |
| | | Sulfur | 1.5 | 1.5 | 1.5 | 1.5 | 1.5 | 1.5 | 1.5 | 1.5 | |
| Number of Molecules of Organic Acid Compound in First Stage of Kneading (mol) | | | 2.68 × 10⁻² | 7.0 × 10⁻³ | 2.68 × 10⁻² | 9.0 × 10⁻³ | 1.70 × 10⁻² | 2.19 × 10⁻² | 9.9 × 10⁻³ | 1.49 × 10⁻² | |
| Number of Molecules of Guanidine in First Stage of Kneading (mol) | | | — | — | 4.7 × 10⁻³ | 4.7 × 10⁻³ | 4.7 × 10⁻³ | 4.7 × 10⁻³ | 4.7 × 10⁻³ | 4.7 × 10⁻³ | |
| Number of Molecules of Silane Coupling Agent in First Stage of Kneading (mol) | | | 8.2 × 10⁻³ | — | 8.2 × 10⁻³ | 8.2 × 10⁻³ | 8.2 × 10⁻³ | 8.2 × 10⁻³ | 8.2 × 10⁻³ | 8.2 × 10⁻³ | |
| Vulcanizate Physical Property | | Low-Heat-Generation Property (tanδ index) | 100 | 101 | 112 | 114 | 112 | 112 | 113 | 112 | |

| Formulation | | | Example | | | | | | | | |
|---|---|---|---|---|---|---|---|---|---|---|---|
| | | Part by mass | 15 | 16 | 17 | 18 | 19 | 20 | 21 | 22 | |
| | First Stage of Kneading | Emulsion-Polymerized SBR *1 | — | 10 | — | 20 | 30 | 30 | 50 | 60 | |
| | | Solution-Polymerized SBR *2 | 100 | 90 | 100 | 80 | 70 | 70 | 50 | 40 | |
| | | Carbon Black N220 *3 | 10 | 10 | 10 | 10 | 10 | 10 | 10 | 10 | |
| | | Silica *4 | 50 | 50 | 50 | 50 | 50 | 50 | 50 | 50 | |

| Formulation | | | Comparative Example | | | | | | | |
|---|---|---|---|---|---|---|---|---|---|---|
| | | Part by mass | 9 | 10 | 11 | 12 | 13 | 14 | 15 | |
| | First Stage of Kneading | Emulsion-Polymerized SBR *1 | — | 10 | 20 | 30 | 30 | 50 | 60 | |
| | | Solution-Polymerized SBR *2 | 100 | 90 | 80 | 70 | 70 | 50 | 40 | |
| | | Carbon Black N220 *3 | 10 | 10 | 10 | 10 | 10 | 10 | 10 | |
| | | Silica *4 | 50 | 50 | 50 | 50 | 50 | 50 | 50 | |

TABLE 1-continued

| | | | | | | | | | | | | | | | | |
|---|---|---|---|---|---|---|---|---|---|---|---|---|---|---|---|---|
| | Silane Coupling Agent Si75 *5 | 4 | 4 | 4 | 4 | 4 | 4 | 4 | 4 | 4 | 4 | 4 | 4 | 4 | 4 | 4 |
| | Aromatic Oil | 30 | 30 | 30 | 30 | 30 | 30 | 30 | 30 | 30 | 30 | 30 | 30 | 30 | 30 | 30 |
| | Stearic Acid | 1.2 | 1.4 | 2 | 1.4 | 1.2 | 1.5 | 1.2 | 1.4 | 1.5 | 1.8 | 1.8 | 1.5 | 1.7 | 1.5 | 1.8 |
| | Antioxidant 6PPD *6 | 1 | 1 | 1 | 1 | 1 | 1 | 1 | 1 | 1 | 1 | 1 | 1.5 | 1 | 1 | 1 |
| | 1,3-Diphenylguanidine *7 | 0.6 | 1 | 1 | 1.3 | 1.5 | 1.5 | 2 | 2.5 | 0.6 | 1 | 1.3 | 1.5 | 1.7 | 2 | 2.5 |
| Final Stage of Kneading | Stearic Acid | 0.8 | 0.6 | 0.2 | 0.6 | 0.8 | 0.5 | 0.5 | 0.5 | 0.5 | 0.2 | 0.2 | 0.5 | 0.3 | 0.3 | 0.3 |
| | Antioxidant 6PPD *6 | — | — | — | — | — | — | — | — | — | — | — | — | — | — | — |
| | Antioxidant TMDQ *8 | 1 | 1 | 1 | 1 | 1 | 1 | 1 | 1 | 1 | 1 | 1 | 1 | 1 | 1 | 1 |
| | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *7 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Vulcanization Accelerator MBTS *9 | 1 | 1 | 1 | 1 | 1 | 1 | 1 | 1 | 1 | 1 | 1 | 1 | 1 | 1 | 1 |
| | Vulcanization Accelerator TBBS *10 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Number of Molecules of Organic Acid Compound in First Stage of Kneading (mol) | | $4.2 \times 10^{-3}$ | $6.9 \times 10^{-3}$ | $7.0 \times 10^{-3}$ | $8.9 \times 10^{-3}$ | $1.02 \times 10^{-2}$ | $1.12 \times 10^{-2}$ | $1.41 \times 10^{-2}$ | $1.68 \times 10^{-2}$ | $5.3 \times 10^{-3}$ | $8.3 \times 10^{-3}$ | $1.03 \times 10^{-2}$ | $1.12 \times 10^{-2}$ | $1.30 \times 10^{-2}$ | $1.52 \times 10^{-2}$ | $1.82 \times 10^{-2}$ |
| Number of Molecules of Guanidine in First Stage of Kneading (mol) | | $2.8 \times 10^{-3}$ | $4.7 \times 10^{-3}$ | $4.7 \times 10^{-3}$ | $6.2 \times 10^{-3}$ | $7.1 \times 10^{-3}$ | $8.0 \times 10^{-3}$ | $9.5 \times 10^{-3}$ | $1.18 \times 10^{-2}$ | $2.8 \times 10^{-3}$ | $4.7 \times 10^{-3}$ | $6.2 \times 10^{-3}$ | $7.1 \times 10^{-3}$ | $8.0 \times 10^{-3}$ | $9.5 \times 10^{-3}$ | $1.18 \times 10^{-2}$ |
| Number of Molecules of Silane Coupling Agent in First Stage of Kneading (mol) | | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | 118 | 119 | 118 | 120 | 120 | 118 | 117 | 117 | 109 | 109 | 110 | 110 | 107 | 106 | 107 |

[Notes]
*1: JSR's emulsion-polymerized styrene-butadiene copolymer rubber (SBR), trade name "#1500"
*2: Asahi Kasei's solution-polymerized styrene-butadiene copolymer rubber (SBR), trade name "Tufdene 2000"
*3: N220 (ISAF), Asahi Carbon's trade name "#80"
*4: Tosoh Silica's trade name "Nipsil AQ", BET specific surface area 205 m²/g
*5: Bis(3-triethoxysilylpropyl) disulfide (mean sulfur chain length: 2.35), Evonik's silane coupling agent, trade name "Si75" (registered trademark)
*6: N-(1,3-dimethylbutyl)-N'-phenyl-p-phenylenediamine, by Ouchi Shinko Chemical, trade name "Nocrac 6C"
*7: 1,3-Diphenylguanidine, Sanshin Chemical's trade name "Sanceler D"
*8: 2,2,4-Trimethyl-1,2-dihydroquinoline polymer, Ouchi Shinko Chemical's trade name "Nocrac 224"
*9: Di-2-benzothiazolyl disulfide, Sanshin Chemical's trade name "Sanceler DM"
*10: N-tert-butyl-2-benzothiazolylsulfenamide, Sanshin Chemical's trade name "Sanceler NS"

Examples 23 and 24, and Comparative Examples 16 to 18

Next, according to the compositional formulation and the kneading method shown in Table 2, the ingredients were kneaded in a Banbury mixer in such a controlled manner that the highest temperature of the rubber composition in the first stage of kneading could be 150° C., thereby preparing 5 types of rubber compositions. In the first stage of kneading the rubber compositions of Examples 23 and 24, the rubber component (A), all the inorganic filler (B) and all the silane coupling agent (C) were kneaded, and then the vulcanization accelerator (D) of 1,3-diphenylguanidine, a type of guanidine was added thereto and further kneaded. The obtained 5 rubber compositions were evaluated in point of the low-heat-generation property (tan δ index) thereof according to the above-mentioned method. The results are shown in Table 2. For comparison, the data of Examples 1 and 6 and Comparative Example 1 are again shown therein.

TABLE 2

| | | Part by mass | Example 1 | Example 6 | Example 23 | Example 24 | Comparative Example 1 | Comparative Example 16 | Comparative Example 17 | Comparative Example 18 |
|---|---|---|---|---|---|---|---|---|---|---|
| Formulation | First Stage of Kneading | Emulsion-Polymerized SBR *1 | — | — | — | — | 100 | — | 100 | — |
| | | Solution-Polymerized SBR *2 | 100 | 100 | 100 | 100 | — | 100 | — | 100 |
| | | Carbon Black N220 *3 | 10 | 10 | 10 | 10 | 10 | 10 | 10 | 10 |
| | | Silica *4 | 50 | 50 | 50 | 50 | 50 | 50 | 50 | 50 |
| | | Silane Coupling Agent Si75 *5 | 4 | 4 | — | — | 4 | 4 | — | — |
| | | Silane Coupling Agent *11 | — | — | 4 | 4 | — | — | 4 | 4 |
| | | Aromatic Oil | 30 | 30 | 30 | 30 | 30 | 30 | 30 | 30 |
| | | Stearic Acid | — | 1 | — | 1 | 2 | 2 | 2 | 2 |
| | | Antioxidant 6PPD *6 | — | 1 | — | 1 | 1 | 1 | 1 | 1 |
| | | 1,3-Diphenylguanidine *7 | 1 | 1 | 1 | 1 | — | — | — | — |
| | Final Stage of Kneading | Stearic Acid | 2 | 1 | 2 | 1 | — | — | — | — |
| | | Antioxidant 6PPD *6 | 1 | — | 1 | — | — | — | — | — |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Number of Molecules of Organic Acid Compound in First Stage of Kneading (mol) | | | — | $3.5 \times 10^{-3}$ | — | $3.5 \times 10^{-3}$ | $2.68 \times 10^{-2}$ | $7.0 \times 10^{-3}$ | $2.68 \times 10^{-2}$ | $7.0 \times 10^{-3}$ |
| Number of Molecules of Guanidine in First Stage of Kneading (mol) | | | $4.7 \times 10^{-3}$ | $4.7 \times 10^{-3}$ | $4.7 \times 10^{-3}$ | $4.7 \times 10^{-3}$ | — | — | — | — |
| Vulcanizate Physical Property | | Low-Heat-Generation Property (tan δ index) | 128 | 120 | 132 | 125 | 100 | 101 | 112 | 113 |

[Notes]
*1 to *10 are all the same as in Table 1.
*11: Silane coupling agent obtained in Production Example 1 and represented by the following average compositional formula: $(CH_3CH_2O)_3Si-(CH_2)_3-S-(CH_2)_6-S_{2.5}-(CH_2)_6-S-(CH_2)_3-Si(OCH_2CH_3)_3$ Example 25 and 26, and Comparative Example 19

According to the compositional formulation and the kneading method shown in Table 3, the ingredients were kneaded in a Banbury mixer to prepare 3 types of rubber compositions. The ingredients were kneaded in a Banbury mixer in such a controlled manner that the highest temperature of the rubber composition in the first stage of kneading could be 150° C., thereby preparing 3 types of rubber compositions. In the first stage of kneading the rubber compositions of Examples 25 and 26, the rubber component (A), all the inorganic filler (B) and all the silane coupling agent (C) were kneaded, and then the vulcanization accelerator (D) of 1,3-diphenylguanidine or 1-o-tolylbiguanide, a type of guanidine was added thereto and further kneaded. The obtained 3 rubber compositions were evaluated in point of the low-heat-generation property (tan δ index) thereof according to the above-mentioned method. The results are shown in Table 3. For comparison, the data of Example 1 are again shown therein.

TABLE 3

| Part by mass | | | Example 1 | Example 25 | Example 26 | Comparative Example 19 |
|---|---|---|---|---|---|---|
| Formulation | First Stage of Kneading | Emulsion-Polymerized SBR*1 | — | — | — | — |
| | | Solution-Polymerized SBR *2 | 100 | 100 | 100 | 100 |
| | | Carbon Black N220 *3 | 10 | 10 | 10 | 10 |
| | | Silica *4 | 50 | 50 | 50 | 50 |
| | | Silane Coupling Agent Si75 *5 | 4 | 4 | 4 | — |
| | | Aromatic Oil | 30 | 30 | 30 | 30 |
| | | Stearic Acid | — | — | — | 2 |
| | | Antioxidant 6PPD *6 | — | — | — | 1 |
| | | 1,3-Diphenylguanidine *7 | 1 | — | — | — |
| | | 1,3-Di-o-tolylguanidine *12 | — | 1 | — | — |
| | | 1-o-tolylbiguanide *13 | — | — | 1 | — |
| | Final Stage of Kneading | Stearic Acid | 2 | 2 | 2 | — |
| | | Antioxidant 6PPD *6 | 1 | 1 | 1 | — |
| | | Antioxidant TMDQ *8 | 1 | 1 | 1 | 1 |
| | | Zinc Flower | 2.5 | 2.5 | 2.5 | 2.5 |
| | | 1,3-Diphenylguanidine *7 | 0.6 | 0.6 | 0.6 | 0.6 |
| | | Vulcanization Accelerator MBTS *9 | 1 | 1 | 1 | 1 |
| | | Vulcanization Accelerator TBBS *10 | 0.6 | 0.6 | 0.6 | 0.6 |
| | | Sulfur | 1.5 | 1.5 | 1.5 | 1.5 |
| Number of Molecules of Organic Acid Compound in First Stage of Kneading (mol) | | | — | — | — | $7.0 \times 10^{-3}$ |
| Number of Molecules of Guanidine in First Stage of Kneading (mol) | | | $4.7 \times 10^{-3}$ | $4.2 \times 10^{-3}$ | $5.2 \times 10^{-3}$ | — |
| Vulcanizate Physical Property | | Low-Heat-Generation Property (tanδ index) | 128 | 130 | 124 | 100 |

[Notes]
*1 to *10 are all the same as in Table 1.
*12: Ouchi Shinko Chemical's trade name "Nocceler DT"
*13: Ouchi Shinko Chemical's trade name "Nocceler BG"

Examples 27 to 47, and Comparative Examples 20 to 32

According to the compositional formulation and the kneading method shown in Table 4, the ingredients were kneaded in a Banbury mixer in such a controlled manner that the highest temperature of the rubber composition in the first stage of kneading could be 150° C., thereby preparing 34 types of rubber compositions. In the first stage of kneading all the rubber compositions, the rubber component (A), all the inorganic filler (B) and all the silane coupling agent (C) were kneaded, and then the vulcanization accelerator of N-cyclohexyl-2-benzothiazolylsulfenamide, a type of sulfenamide was added thereto and further kneaded. The obtained 34 rubber compositions were evaluated in point of the low-heat-generation property (tan δ index) thereof according to the above-mentioned method. The results are shown in Table 4. For comparison, the data of Comparative Examples 1 and 2 are again shown therein.

TABLE 4

| | | | Example | | | | | | | | | | | | Comparative Example | | | | | | | |
|---|---|---|---|---|---|---|---|---|---|---|---|---|---|---|---|---|---|---|---|---|---|---|
| | Part by mass | | 27 | 28 | 29 | 30 | 31 | 32 | 33 | 34 | 35 | 36 | 37 | 38 | 39 | 1 | 2 | 20 | 21 | 22 | 23 | 24 | 25 |
| Formulation | First Stage of Kneading | Emulsion-Polymerized SBR *1 | — | — | — | — | — | — | — | 10 | 20 | 30 | 40 | 10 | 10 | 100 | — | 100 | — | 50 | 75 | 50 | 75 |
| | | Solution-Polymerized SBR *2 | 100 | 100 | 100 | 100 | 100 | 100 | 100 | 90 | 80 | 70 | 60 | 90 | 90 | — | 100 | — | 100 | 50 | 25 | 50 | 25 |
| | | Carbon Black N220 *3 | 10 | 10 | 10 | 10 | 10 | 10 | 10 | 10 | 10 | 10 | 10 | 10 | 10 | 10 | 10 | 10 | 10 | 10 | 10 | 10 | 10 |
| | | Silica *4 | 50 | 50 | 50 | 50 | 50 | 50 | 50 | 50 | 50 | 50 | 60 | 50 | 50 | 50 | 50 | 50 | 50 | 50 | 50 | 50 | 50 |
| | | Silane Coupling Agent Si75 *5 | 4 | 4 | 4 | 4 | 4 | 4 | 4 | 4 | 4 | 4 | 4.8 | 4 | 4 | 4 | 4 | 4 | 4 | 4 | 4 | 4 | 4 |
| | | Aromatic Oil | 30 | 30 | 30 | 30 | 30 | 30 | 30 | 30 | 30 | 30 | 30 | 30 | 30 | 30 | 30 | 30 | 30 | 30 | 30 | 30 | 30 |
| | | Stearic Acid | — | — | — | — | — | — | 0.5 | — | — | — | — | 0.5 | 0.7 | 2 | 2 | 2 | 2 | 1 | 2 | — | — |
| | | Antioxidant 6PPD *6 | — | 0.6 | 0.1 | 1.5 | — | — | 1 | 1 | 1 | 1 | — | 1 | 1 | — | 1 | 1 | 1 | 1 | 1 | 1 | 1 |
| | | N-cyclohexyl-2-benzo-thiazolylsulfenamide *14 | 1 | — | — | — | 3 | 1 | — | — | — | 1.3 | 1.7 | — | — | — | — | — | — | 1 | — | — | — |
| | Final Stage of Kneading | Stearic Acid | 2 | 2 | 2 | 2 | 2 | 1 | 1.5 | 2 | 2 | 2 | 2 | 1.5 | 1.3 | — | — | — | — | 1 | — | 2 | 2 |
| | | Antioxidant 6PPD *6 | 1 | 1 | 1 | 1 | 1 | — | — | 1 | 1 | 1 | 1 | 1 | 1 | 1 | — | 1 | 1 | 1 | 1 | 1 | 1 |
| | | Antioxidant TMDQ *8 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Number of Molecules of Organic Acid Compound in First Stage of Kneading (mol) | | | — | — | — | 5.7 × 10⁻³ | — | 3.5 × 10⁻³ | 1.8 × 10⁻³ | 2.0 × 10⁻³ | 4.0 × 10⁻³ | 6.0 × 10⁻³ | 7.9 × 10⁻³ | 3.7 × 10⁻³ | 4.4 × 10⁻³ | 2.68 × 10⁻² | 7.0 × 10⁻³ | 2.68 × 10⁻² | 7.0 × 10⁻³ | 1.70 × 10⁻² | 2.19 × 10⁻² | 9.9 × 10⁻³ | 1.49 × 10⁻² |
| Number of Molecules of Sulfenamide in First Stage of Kneading (mol) | | | 3.8 × 10⁻³ | 2.3 × 10⁻³ | 3.8 × 10⁻⁴ | 8.2 × 10⁻³ | 1.1 × 10⁻³ | 3.8 × 10⁻³ | 3.8 × 10⁻³ | 3.8 × 10⁻³ | 3.8 × 10⁻³ | 4.9 × 10⁻³ | 6.4 × 10⁻³ | 3.8 × 10⁻³ | 3.8 × 10⁻³ | — | — | 3.8 × 10⁻³ | 3.8 × 10⁻³ | 3.8 × 10⁻³ | 3.8 × 10⁻³ | 3.8 × 10⁻³ | 3.8 × 10⁻³ |
| Number of Molecules of Silane Coupling Agent in First Stage of Kneading (mol) | | | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 8.2 × 10⁻³ | 9.8 × 10⁻³ | 8.2 × 10⁻³ | 8.2 × 10⁻³ | 8.2 × 10⁻³ | — | 8.2 × 10⁻³ | 8.2 × 10⁻³ | 8.2 × 10⁻³ | 8.2 × 10⁻³ | 8.2 × 10⁻³ | 8.2 × 10⁻³ |
| Vulcanizate Physical Property | Low-Heat-Generation Property (tanδ index) | | 118 | 115 | 114 | 118 | 116 | 116 | 116 | 117 | 117 | 116 | 116 | 114 | 114 | 100 | 101 | 107 | 110 | 108 | 107 | 107 | 108 |

| | | | Example | | | | | | | | | Comparative Example | | | | | | |
|---|---|---|---|---|---|---|---|---|---|---|---|---|---|---|---|---|---|---|
| | Part by mass | | 40 | 41 | 42 | 43 | 44 | 45 | 46 | 47 | 26 | 27 | 28 | 29 | 30 | 31 | 32 |
| Formulation | First Stage of Kneading | Emulsion-Polymerized SBR *1 | — | 10 | — | 20 | 30 | 30 | 50 | 60 | — | 10 | 20 | 30 | 30 | 50 | 60 |
| | | Solution-Polymerized SBR *2 | 100 | 90 | 100 | 80 | 70 | 70 | 50 | 40 | 100 | 90 | 80 | 70 | 70 | 50 | 40 |
| | | Carbon Black N220 *3 | 10 | 10 | 10 | 10 | 10 | 10 | 10 | 10 | 10 | 10 | 10 | 10 | 10 | 10 | 10 |
| | | Silica *4 | 50 | 50 | 50 | 50 | 50 | 50 | 50 | 50 | 50 | 50 | 50 | 50 | 50 | 50 | 50 |
| | | Silane Coupling Agent Si75 *5 | 4 | 4 | 4 | 4 | 4 | 4 | 4 | 4 | 4 | 4 | 4 | 4 | 4 | 4 | 4 |
| | | Aromatic Oil | 30 | 30 | 30 | 30 | 30 | 30 | 30 | 30 | 30 | 30 | 30 | 30 | 30 | 30 | 30 |
| | | Stearic Acid | 0.9 | 1 | 1.5 | 0.9 | 0.7 | 1 | 0.3 | 0.6 | 1.1 | 1.2 | 1.1 | 0.9 | 1.2 | 0.6 | 0.9 |
| | | Antioxidant 6PPD *6 | 1 | 1 | 1 | 1 | 1 | 1 | 1 | 1 | 1 | 1 | 1 | 1 | 1 | 1 | 1 |

TABLE 4-continued

| | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Final Stage of Kneading | N-cyclohexyl-2-benzothiazolylsulfenamide *14 | 0.6 | 1 | 1 | 1.3 | 1.5 | 1.7 | 2 | 2.5 | 0.6 | 1 | 1.3 | 1.5 | 1.7 | 2 | 2.5 |
| | Stearic Acid | 1.1 | 0.6 | 0.5 | 0.6 | 1.3 | 1 | 1.7 | 1.4 | 0.9 | 0.8 | 0.2 | 1.1 | 0.8 | 1.4 | 1.1 |
| | Antioxidant 6PPD *6 | — | — | — | — | — | — | — | — | — | — | — | — | — | — | — |
| | Antioxidant TMDQ *8 | 1 | 1 | 1 | 1 | 1 | 1 | 1 | 1 | 1 | 1 | 1 | 1 | 1 | 1 | 1 |
| | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *7 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Vulcanization Accelerator MBTS *9 | 1 | 1 | 1 | 1 | 1 | 1 | 1 | 1 | 1 | 1 | 1 | 1 | 1 | 1 | 1 |
| | Vulcanization Accelerator TBBS *10 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Number of Molecules of Organic Acid Compound in First Stage of Kneading (mol) | $3.2 \times 10^{-3}$ | $5.5 \times 10^{-3}$ | $5.3 \times 10^{-3}$ | $7.1 \times 10^{-3}$ | $8.4 \times 10^{-3}$ | $9.5 \times 10^{-3}$ | $1.10 \times 10^{-2}$ | $1.40 \times 10^{-2}$ | $3.9 \times 10^{-3}$ | $6.2 \times 10^{-3}$ | $7.8 \times 10^{-3}$ | $9.1 \times 10^{-3}$ | $1.02 \times 10^{-2}$ | $1.20 \times 10^{-2}$ | $1.51 \times 10^{-2}$ |
| | Number of Molecules of Sulfenamide in First Stage of Kneading (mol) | $2.3 \times 10^{-3}$ | $3.8 \times 10^{-3}$ | $3.8 \times 10^{-3}$ | $4.9 \times 10^{-3}$ | $5.7 \times 10^{-3}$ | $6.4 \times 10^{-3}$ | $7.6 \times 10^{-3}$ | $9.5 \times 10^{-3}$ | $2.3 \times 10^{-3}$ | $3.8 \times 10^{-3}$ | $4.9 \times 10^{-3}$ | $5.7 \times 10^{-3}$ | $6.4 \times 10^{-3}$ | $7.6 \times 10^{-3}$ | $9.5 \times 10^{-3}$ |
| | Number of Molecules of Silane Coupling Agent in First Stage of Kneading (mol) | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | 118 | 118 | 119 | 118 | 119 | 118 | 117 | 117 | 106 | 105 | 107 | 107 | 106 | 106 | 105 |

[Notes]
*1 to *10 are all the same as in Table 1.
*14: Ouchi Shinko Chemical's trade name "Nocceler CZ"

Examples 48 to 50

Next, according to the compositional formulation and the kneading method shown in Table 5 or Table 6, the ingredients were kneaded in a Banbury mixer in such a controlled manner that the highest temperature of the rubber composition in the first stage of kneading could be 150° C., thereby preparing 2 types of rubber compositions. In the first stage of kneading all the rubber compositions, the rubber component (A), all the inorganic filler (B) and all the silane coupling agent (C) were kneaded, and then the vulcanization accelerator of N-cyclohexyl-2-benzothiazolylsulfenamide or N-tert-butyl-2-benzothiazolylsulfenamide, a type of sulfenamide was added thereto and further kneaded. The obtained 3 rubber compositions were evaluated in point of the low-heat-generation property (tan δ index) thereof according to the above-mentioned method. The results are shown in Table 5 and Table 6. For comparison, the data of Examples 27 and 32 and Comparative Examples 1, and 16 to 18 are again shown in Table 5; and the data of Example 27 and Comparative Example 19 are in Table 6.

TABLE 5

| | | | Example | | | | Comparative Example | | | |
|---|---|---|---|---|---|---|---|---|---|---|
| | | Part by mass | 27 | 32 | 48 | 49 | 1 | 16 | 17 | 18 |
| Formulation | First Stage of Kneading | Emulsion-Polymerized SBR *1 | — | — | — | — | 100 | — | 100 | — |
| | | Solution-Polymerized SBR *2 | 100 | 100 | 100 | 100 | — | 100 | — | 100 |
| | | Carbon Black N220 *3 | 10 | 10 | 10 | 10 | 10 | 10 | 10 | 10 |
| | | Silica *4 | 50 | 50 | 50 | 50 | 50 | 50 | 50 | 50 |
| | | Silane Coupling Agent Si75 *5 | 4 | 4 | — | — | 4 | 4 | — | — |
| | | Silane Coupling Agent *11 | — | — | 4 | 4 | — | — | 4 | 4 |
| | | Aromatic Oil | 30 | 30 | 30 | 30 | 30 | 30 | 30 | 30 |
| | | Stearic Acid | — | 1 | — | 1 | 2 | 2 | 2 | 2 |
| | | Antioxidant 6PPD *6 | — | 1 | — | 1 | 1 | 1 | 1 | 1 |
| | | N-cyclohexyl-2-benzothiazolylsulfenamide *14 | 1 | 1 | 1 | 1 | — | — | — | — |
| | Final Stage of Kneading | Stearic Acid | 2 | 1 | 2 | 1 | — | — | — | — |
| | | Antioxidant 6PPD *6 | 1 | — | 1 | — | — | — | — | — |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Number of Molecules of Organic Acid Compound in First Stage of Kneading (mol) | | | — | $3.5 \times 10^{-3}$ | — | $3.5 \times 10^{-3}$ | $2.68 \times 10^{-2}$ | $7.0 \times 10^{-3}$ | $2.68 \times 10^{-2}$ | $7.0 \times 10^{-3}$ |
| Number of Molecules of Sulfenamide in First Stage of Kneading (mol) | | | $3.8 \times 10^{-3}$ | $3.8 \times 10^{-3}$ | $3.8 \times 10^{-3}$ | $3.8 \times 10^{-3}$ | — | — | — | — |
| Vulcanizate Physical Property | Low-Heat-Generation Property (tan δ index) | | 118 | 116 | 124 | 120 | 100 | 101 | 112 | 113 |

[Notes]
*1 to *10 and *14 are all the same as in Table 4.
*11: Silane coupling agent obtained in Production Example 1 and represented by the following average compositional formula: $(CH_3CH_2O)_3Si—(CH_2)_3—S—(CH_2)_6—S_{2.5}—(CH_2)_6—S—(CH_2)_3—Si(OCH_2CH_3)_3$

TABLE 6

| | | | Example | | Comparative Example |
|---|---|---|---|---|---|
| | | Part by mass | 27 | 50 | 19 |
| Formulation | First Stage of Kneading | Emulsion-Polymerized SBR *1 | — | — | — |
| | | Solution-Polymerized SBR *2 | 100 | 100 | 100 |
| | | Carbon Black N220 *3 | 10 | 10 | 10 |
| | | Silica *4 | 50 | 50 | 50 |
| | | Silane Coupling Agent Si75 *5 | 4 | 4 | — |
| | | Aromatic Oil | 30 | 30 | 30 |
| | | Stearic Acid | — | — | 2 |
| | | Antioxidant 6PPD *6 | — | — | 1 |
| | | N-cyclohexyl-2-benzothiazolylsulfenamide *14 | 1 | — | — |
| | | N-tert-butyl-2-benzothiazolylsulfenamide *10 | — | 1 | — |
| | Final Stage of Kneading | Stearic Acid | 2 | 2 | — |
| | | Antioxidant 6PPD *6 | 1 | 1 | — |
| | | Antioxidant TMDQ *8 | 1 | 1 | 1 |

TABLE 6-continued

|  | Part by mass | Example 27 | Example 50 | Comparative Example 19 |
|---|---|---|---|---|
|  | Zinc Flower | 2.5 | 2.5 | 2.5 |
|  | 1,3-Diphenylguanidine *7 | 0.6 | 0.6 | 0.6 |
|  | Vulcanization Accelerator MBTS *9 | 1 | 1 | 1 |
|  | Vulcanization Accelerator TBBS *10 | 0.6 | 0.6 | 0.6 |
|  | Sulfur | 1.5 | 1.5 | 1.5 |
| Number of Molecules of Organic Acid Compound in First Stage of Kneading (mol) |  | — | — | $7.0 \times 10^{-3}$ |
| Number of Molecules of Sulfenamide in First Stage of Kneading (mol) |  | $3.8 \times 10^{-3}$ | $4.2 \times 10^{-3}$ | — |
| Vulcanizate Physical Property | Low-Heat-Generation Property (tan δ index) | 118 | 121 | 100 |

[Notes]
*1 to *10 and *14 are all the same as in Table 4.

Examples 51 to 71, and Comparative Examples 33 to 45

According to the compositional formulation and the kneading method shown in Table 7, the ingredients were kneaded in a Banbury mixer in such a controlled manner that the highest temperature of the rubber composition in the first stage of kneading could be 150° C., thereby preparing 34 types of rubber compositions. In the first stage of kneading all the rubber compositions, the rubber component (A), all the inorganic filler (B) and all the silane coupling agent (C) were kneaded, and then the vulcanization accelerator of 2-mercaptobenzothiazole, a type of thiazole was added thereto and further kneaded. The obtained 34 rubber compositions were evaluated in point of the low-heat-generation property (tan δ index) thereof according to the above-mentioned method. The results are shown in Table 7. For comparison, the data of Comparative Examples 1 and 2 are again shown therein.

TABLE 7

| | | Part by mass | Example |||||||||||||||
|---|---|---|---|---|---|---|---|---|---|---|---|---|---|---|---|---|
| | | | 51 | 52 | 53 | 54 | 55 | 56 | 57 | 58 | 59 | 60 | 61 | 62 | 63 | 1 |
| Formu-lation | First Stage of Kneading | Emulsion-Polymerized SBR *1 | 100 | — | — | — | — | — | — | — | — | — | — | — | — | 100 |
| | | Solution-Polymerized SBR *2 | — | 100 | 100 | 100 | 100 | 100 | 100 | 10 | 20 | 30 | 40 | 10 | 10 | — |
| | | Carbon Black N220 *3 | 10 | 10 | 10 | 10 | 10 | 10 | 10 | 90 | 80 | 70 | 60 | 90 | 90 | 10 |
| | | Silica *4 | 50 | 50 | 50 | 50 | 50 | 50 | 50 | 50 | 50 | 50 | 60 | 50 | 50 | 50 |
| | | Silane Coupling Agent Si75 *5 | 4 | 4 | 4 | 4 | 4 | 4 | 4 | 4 | 4 | 4 | 4.8 | 4 | 4 | 4 |
| | | Aromatic Oil | 30 | 30 | 30 | 30 | 30 | 30 | 30 | 30 | 30 | 30 | 30 | 30 | 30 | 30 |
| | | Stearic Acid | — | — | — | — | — | — | 0.5 | — | — | — | — | 0.5 | 0.7 | — |
| | | Antioxidant 6PPD *6 | — | — | — | — | — | — | 1 | — | — | — | — | — | — | — |
| | | 2-Mercaptobenzothiazole *15 | 0.6 | 0.3 | 0.05 | 0.8 | 1.5 | 0.6 | 0.6 | 0.6 | 0.6 | 0.8 | 1.1 | 0.6 | 0.6 | 0.6 |
| Final Stage of Kneading | | Stearic Acid | 2 | 2 | 2 | 2 | 2 | 2 | 1.5 | 2 | 2 | 2 | 2 | 1.5 | 1.3 | 2 |
| | | Antioxidant 6PPD *6 | 1 | 1 | 1 | 1 | 1 | — | — | 1 | 1 | 1 | 1 | 1 | 1 | 1 |
| | | Antioxidant TMDQ *8 | 1 | 1 | 1 | 1 | 1 | 1 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Number of Molecules of Organic Acid Compound in First Stage of Kneading (mol) | | | — | 1.8×10⁻³ | 3.0×10⁻⁴ | 4.8×10⁻³ | 9.0×10⁻³ | 3.5×10⁻³ | 1.8×10⁻³ | 2.0×10⁻³ | 4.0×10⁻³ | 6.0×10⁻³ | 7.9×10⁻³ | 3.7×10⁻³ | 4.4×10⁻³ | 2.68×10⁻³ |
| Number of Molecules of Thiazole in First Stage of Kneading (mol) | | | 3.6×10⁻³ | 8.2×10⁻³ | 8.2×10⁻³ | 8.2×10⁻³ | 8.2×10⁻³ | 3.6×10⁻³ | 3.6×10⁻³ | 3.6×10⁻³ | 3.6×10⁻³ | 4.8×10⁻³ | 6.6×10⁻³ | 3.6×10⁻³ | 3.6×10⁻³ | — |
| Number of Molecules of Silane Coupling Agent in First Stage of Kneading (mol) | | | 8.2×10⁻³ | 8.2×10⁻³ | 8.2×10⁻³ | 8.2×10⁻³ | 8.2×10⁻³ | 8.2×10⁻³ | 8.2×10⁻³ | 8.2×10⁻³ | 8.2×10⁻³ | 8.2×10⁻³ | 9.8×10⁻³ | 8.2×10⁻³ | 8.2×10⁻³ | 8.2×10⁻³ |
| Vulcanizate Physical Property | | Low-Heat-Generation Property (tanδ index) | 118 | 116 | 114 | 118 | 116 | 117 | 117 | 117 | 117 | 117 | 114 | 116 | 115 | 100 |

| | | Part by mass | Comparative Example |||||||
|---|---|---|---|---|---|---|---|---|---|
| | | | 2 | 33 | 34 | 35 | 36 | 37 | 38 |
| Formu-lation | First Stage of Kneading | Emulsion-Polymerized SBR *1 | — | 100 | — | — | — | — | — |
| | | Solution-Polymerized SBR *2 | 100 | — | 100 | 50 | 75 | 50 | 75 |
| | | Carbon Black N220 *3 | 10 | 10 | 10 | 10 | 25 | 50 | 25 |
| | | Silica *4 | 50 | 50 | 50 | 50 | 50 | 50 | 50 |
| | | Silane Coupling Agent Si75 *5 | — | 4 | 4 | 4 | 4 | 4 | 4 |
| | | Aromatic Oil | 30 | 30 | 30 | 30 | 30 | 30 | 30 |
| | | Stearic Acid | 2 | 2 | 2 | 2 | 2 | — | — |
| | | Antioxidant 6PPD *6 | 1 | 1 | 1 | 1 | 1 | — | — |
| | | 2-Mercaptobenzothiazole *15 | — | 0.6 | 0.6 | 0.6 | 0.6 | 0.6 | 0.6 |
| Final Stage of Kneading | | Stearic Acid | — | — | — | — | — | 2 | 2 |
| | | Antioxidant 6PPD *6 | — | — | — | — | — | 1 | 1 |
| | | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | 7.0×10⁻³ | 2.68×10⁻³ | 7.0×10⁻³ | 1.70×10⁻² | 2.19×10⁻² | 9.9×10⁻³ | 1.49×10⁻² |
| Number of Molecules of Thiazole in First Stage of Kneading (mol) | | | — | 3.6×10⁻³ | 3.6×10⁻³ | 3.6×10⁻³ | 3.6×10⁻³ | 3.6×10⁻³ | 3.6×10⁻³ |
| Number of Molecules of Silane Coupling Agent in First Stage of Kneading (mol) | | | — | 8.2×10⁻³ | 8.2×10⁻³ | 8.2×10⁻³ | 8.2×10⁻³ | 8.2×10⁻³ | 8.2×10⁻³ |
| Vulcanizate Physical Property | | Low-Heat-Generation Property (tanδ index) | 101 | 105 | 106 | 105 | 105 | 105 | 106 |

| | | Part by mass | Example ||||||||
|---|---|---|---|---|---|---|---|---|---|---|
| | | | 64 | 65 | 66 | 67 | 68 | 69 | 70 | 71 |
| Formu-lation | First Stage of Kneading | Emulsion-Polymerized SBR *1 | — | 10 | — | 20 | 30 | 30 | 50 | 60 |
| | | Solution-Polymerized SBR *2 | 100 | 90 | 100 | 80 | 70 | 70 | 50 | 40 |
| | | Carbon Black N220 *3 | 10 | 10 | 10 | 10 | 10 | 10 | 10 | 10 |
| | | Silica *4 | 50 | 50 | 50 | 50 | 50 | 50 | 50 | 50 |
| | | Silane Coupling Agent Si75 *5 | 4 | 4 | 4 | 4 | 4 | 4 | 4 | 4 |
| | | Aromatic Oil | 30 | 30 | 30 | 30 | 30 | 30 | 30 | 30 |
| | | Stearic Acid | 0.9 | 0.9 | 1.5 | 0.9 | 0.5 | 1 | 0.3 | 0.6 |
| | | Antioxidant 6PPD *6 | 1 | 1 | 1 | 1 | 1 | 1 | 1 | 1 |
| | | 2-Mercaptobenzothiazole *15 | 0.4 | 0.6 | 0.6 | 0.8 | 0.9 | 1.1 | 1.3 | 1.6 |
| Final | | Stearic Acid | 1.1 | 1.1 | 0.5 | 0.6 | 1.5 | 1 | 1.7 | 1.4 |

| | | Part by mass | Comparative Example ||||||
|---|---|---|---|---|---|---|---|---|
| | | | 39 | 40 | 41 | 42 | 43 | 44 | 45 |
| Formu-lation | First Stage of Kneading | Emulsion-Polymerized SBR *1 | — | 10 | 20 | 30 | 30 | 50 | 60 |
| | | Solution-Polymerized SBR *2 | 100 | 90 | 80 | 70 | 70 | 50 | 40 |
| | | Carbon Black N220 *3 | 10 | 10 | 10 | 10 | 10 | 10 | 10 |
| | | Silica *4 | 50 | 50 | 50 | 50 | 50 | 50 | 50 |
| | | Silane Coupling Agent Si75 *5 | 4 | 4 | 4 | 4 | 4 | 4 | 4 |
| | | Aromatic Oil | 30 | 30 | 30 | 30 | 30 | 30 | 30 |
| | | Stearic Acid | 1.1 | 1.2 | 1.1 | 0.8 | 1.2 | 0.7 | 0.9 |
| | | Antioxidant 6PPD *6 | 1 | 1 | 1 | 1 | 1 | 1 | 1 |
| | | 2-Mercaptobenzothiazole *15 | 0.4 | 0.8 | 0.8 | 0.9 | 1.1 | 1.3 | 1.6 |
| Final | | Stearic Acid | 0.9 | 0.8 | 0.2 | 1.2 | 0.8 | 1.3 | 1.1 |

TABLE 7-continued

| Stage of Kneading | | | | | | | | | | | | | | | | |
|---|---|---|---|---|---|---|---|---|---|---|---|---|---|---|---|---|
| | Antioxidant 6PPD *6 | — | — | — | — | — | — | — | — | — | — | — | — | — | — | — |
| | Antioxidant TMDQ *8 | 1 | 1 | 1 | 1 | 1 | 1 | 1 | 1 | 1 | 1 | 1 | 1 | 1 | 1 | 1 |
| | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *7 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Vulcanization Accelerator MBTS *9 | 1 | 1 | 1 | 1 | 1 | 1 | 1 | 1 | 1 | 1 | 1 | 1 | 1 | 1 | 1 |
| | Vulcanization Accelerator TBBS *10 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Number of Molecules of Organic Acid Compound in First Stage of Kneading (mol) | $3.2 \times 10^{-3}$ | $5.1 \times 10^{-3}$ | $5.3 \times 10^{-3}$ | $7.1 \times 10^{-3}$ | $7.7 \times 10^{-3}$ | $9.5 \times 10^{-3}$ | $1.10 \times 10^{-2}$ | $1.40 \times 10^{-2}$ | $3.9 \times 10^{-3}$ | $6.2 \times 10^{-3}$ | $7.8 \times 10^{-3}$ | $8.8 \times 10^{-3}$ | $1.02 \times 10^{-2}$ | $1.24 \times 10^{-2}$ | $1.51 \times 10^{-2}$ |
| | Number of Molecules of Thiazole in First Stage of Kneading (mol) | $2.4 \times 10^{-3}$ | $3.6 \times 10^{-3}$ | $3.6 \times 10^{-3}$ | $4.8 \times 10^{-3}$ | $5.4 \times 10^{-3}$ | $6.6 \times 10^{-3}$ | $7.8 \times 10^{-3}$ | $9.6 \times 10^{-3}$ | $2.4 \times 10^{-3}$ | $3.6 \times 10^{-3}$ | $4.8 \times 10^{-3}$ | $5.4 \times 10^{-3}$ | $6.6 \times 10^{-3}$ | $7.8 \times 10^{-3}$ | $9.6 \times 10^{-3}$ |
| | Number of Molecules of Silane Coupling Agent in First Stage of Kneading (mol) | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | 118 | 119 | 121 | 120 | 121 | 120 | 120 | 121 | 106 | 106 | 107 | 107 | 107 | 105 | 104 |

[Notes]
*1 to *10 are all the same as in Table 1.
*15: Ouchi Shinko Chemical's trade name "Nocceler M"

Examples 72 to 76

Next, according to the compositional formulation and the kneading method shown in Table 8 or Table 9, the ingredients were kneaded in a Banbury mixer in such a controlled manner that the highest temperature of the rubber composition in the first stage of kneading could be 150° C., thereby preparing 5 types of rubber compositions. In the first stage of kneading all the rubber compositions, the rubber component (A), all the inorganic filler (B) and all the silane coupling agent (C) were kneaded, and then the vulcanization accelerator (D) of 2-mercaptothiazole or di-2-benzothiazolyl disulfide, a type of thiazole was added thereto and further kneaded. The obtained 5 rubber compositions were evaluated in point of the low-heat-generation property (tan δ index) thereof according to the above-mentioned method. The results are shown in Table 8 and Table 9. For comparison, the data of Comparative Examples 1, and 16 to 18 are again shown in Table 8. In Table 9, the data of Example 51 and Comparative Example 19 are again shown for comparison between 2-mercaptobenzothiazole and di-2-benzothiazolyl disulfide.

TABLE 8

| | | | Example | | | | Comparative Example | | | |
|---|---|---|---|---|---|---|---|---|---|---|
| | | Part by mass | 72 | 73 | 74 | 75 | 1 | 16 | 17 | 18 |
| Formulation | First Stage of Kneading | Emulsion-Polymerized SBR *1 | — | — | — | — | 100 | — | 100 | — |
| | | Solution-Polymerized SBR *2 | 100 | 100 | 100 | 100 | — | 100 | — | 100 |
| | | Carbon Black N220 *3 | 10 | 10 | 10 | 10 | 10 | 10 | 10 | 10 |
| | | Silica *4 | 50 | 50 | 50 | 50 | 50 | 50 | 50 | 50 |
| | | Silane Coupling Agent Si75 *5 | 4 | 4 | — | — | 4 | 4 | — | — |
| | | Silane Coupling Agent *11 | — | — | 4 | 4 | — | — | 4 | 4 |
| | | Aromatic Oil | 30 | 30 | 30 | 30 | 30 | 30 | 30 | 30 |
| | | Stearic Acid | — | 1 | — | 1 | 2 | 2 | 2 | 2 |
| | | Antioxidant 6PPD *6 | — | 1 | — | 1 | 1 | 1 | 1 | 1 |
| | | Di-2-benzothiazolyl disulfide *9 | 0.5 | 0.5 | 0.5 | 0.5 | — | — | — | — |
| | Final Stage of Kneading | Stearic Acid | 2 | 1 | 2 | 1 | — | — | — | — |
| | | Antioxidant 6PPD *6 | 1 | — | 1 | — | — | — | — | — |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Number of Molecules of Organic Acid Compound in First Stage of Kneading (mol) | | | — | $3.5 \times 10^{-3}$ | — | $3.5 \times 10^{-3}$ | $2.68 \times 10^{-2}$ | $7.0 \times 10^{-3}$ | $2.68 \times 10^{-2}$ | $7.0 \times 10^{-3}$ |
| Number of Molecules of Thiazole in First Stage of Kneading (mol) | | | $3.0 \times 10^{-3}$ | $3.0 \times 10^{-3}$ | $3.0 \times 10^{-3}$ | $3.0 \times 10^{-3}$ | — | — | — | — |
| Vulcanizate Physical Property | | Low-Heat-Generation Property (tan δ index) | 118 | 117 | 120 | 123 | 100 | 101 | 112 | 113 |

[Notes]
*1 to *10 are all the same as in Table 1.
*11: Silane coupling agent obtained in Production Example 1 and represented by the following average compositional formula: $(CH_3CH_2O)_3Si-(CH_2)_3-S-(CH_2)_6-S_{2.5}-(CH_2)_6-S-(CH_2)_3-Si(OCH_2CH_3)_3$

TABLE 9

| | | | Example | | Comparative Example |
|---|---|---|---|---|---|
| | | Part by mass | 51 | 76 | 19 |
| Formulation | First Stage of Kneading | Emulsion-Polymerized SBR *1 | — | — | — |
| | | Solution-Polymerized SBR *2 | 100 | 100 | 100 |
| | | Carbon Black N220 *3 | 10 | 10 | 10 |
| | | Silica *4 | 50 | 50 | 50 |
| | | Silane Coupling Agent Si75 *5 | 4 | 4 | — |
| | | Aromatic Oil | 30 | 30 | 30 |
| | | Stearic Acid | — | — | 2 |
| | | Antioxidant 6PPD *6 | — | — | 1 |
| | | 2-Mercaptobenzothiazole *15 | 0.6 | — | — |
| | | Di-2-benzothiazolyl disulfide *9 | — | 0.5 | — |
| | Final Stage of Kneading | Stearic Acid | 2 | 2 | — |
| | | Antioxidant 6PPD *6 | 1 | 1 | — |
| | | Antioxidant TMDQ *8 | 1 | 1 | 1 |
| | | Zinc Flower | 2.5 | 2.5 | 2.5 |

TABLE 9-continued

|  | | Example | | Comparative Example |
|---|---|---|---|---|
| Part by mass | | 51 | 76 | 19 |
| | 1,3-Diphenylguanidine *7 | 0.6 | 0.6 | 0.6 |
| | Vulcanization Accelerator MBTS *9 | 1 | 1 | 1 |
| | Vulcanization Accelerator TBBS *10 | 0.6 | 0.6 | 0.6 |
| | Sulfur | 1.5 | 1.5 | 1.5 |
| Number of Molecules of Organic Acid Compound in First Stage of Kneading (mol) | | — | — | $7.0 \times 10^{-3}$ |
| Number of Molecules of Thiazole in First Stage of Kneading (mol) | | $3.6 \times 10^{-3}$ | $3.0 \times 10^{-3}$ | — |
| Vulcanizate Physical Property | Low-Heat-Generation Property (tanδ index) | 118 | 119 | 100 |

[Notes]
*1 to *10 are all the same as in Table 1.
*15: Ouchi Shinko Chemical's trade name "Nocceler M"

Examples 77 to 132, and Comparative Examples 46 to 77

According to the compositional formulation and the kneading method shown in Table 10 to Table 13, the ingredients were kneaded in a Banbury mixer in such a controlled manner that the highest temperature of the rubber composition in the first stage of kneading could be 150° C., thereby preparing 88 types of rubber compositions. In the first stage of kneading all the rubber compositions except Comparative Examples 46, 47, 54, 55, 70 and 71, the rubber component (A), all the inorganic filler (B) and all the silane coupling agent (C) were kneaded, and then the vulcanization accelerator (D) of 1,3-diphenylguanidine, a type of guanidine was added thereto and further kneaded. The obtained 88 rubber compositions were evaluated in point of the low-heat-generation property (tan δ index) thereof according to the above-mentioned method. The results are shown in Table 10 to Table 13.

TABLE 10

| | | | Example | | | | | | | |
|---|---|---|---|---|---|---|---|---|---|---|
| | | Part by mass | 77 | 78 | 79 | 80 | 81 | 82 | 83 | 84 |
| Formulation | First Stage of Kneading | Emulsion-Polymerized SBR *1 | — | — | — | — | — | — | — | — |
| | | Solution-Polymerized SBR *2 | 100 | 100 | 100 | 100 | 100 | 100 | 100 | 100 |
| | | Carbon Black N220 *3 | 10 | 10 | 10 | 10 | 10 | 10 | 10 | 10 |
| | | Silica *16 | 50 | 50 | 50 | 50 | 50 | 50 | 50 | 50 |
| | | Silane Coupling Agent Si75 *5 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | — | — | — | — | — | 1 | 1 | 0.5 |
| | | Antioxidant 6PPD *6 | — | — | — | — | — | 1 | — | 1 |
| | | 1,3-Diphenylguanidine *7 | 1 | 0.6 | 0.1 | 1.5 | 3 | 1 | 1 | 1 |
| | Final Stage of Kneading | Stearic Acid | 2 | 2 | 2 | 2 | 2 | 1 | — | 1.5 |
| | | Antioxidant 6PPD *6 | 1 | 1 | 1 | 1 | 1 | — | 1 | — |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.54 | 0.54 | 0.54 | 0.54 | 0.54 | 0.54 | 0.54 | 0.54 |
| | | Vulcanization Accelerator MBTS *9 | 0.9 | 0.9 | 0.9 | 0.9 | 0.9 | 0.9 | 0.9 | 0.9 |
| | | Vulcanization Accelerator TBBS *10 | 0.54 | 0.54 | 0.54 | 0.54 | 0.54 | 0.54 | 0.54 | 0.54 |
| | | Sulfur | 1.35 | 1.35 | 1.35 | 1.35 | 1.35 | 1.35 | 1.35 | 1.35 |
| Number of Molecules of Organic Acid Compound in First Stage of Kneading (mol) | | | — | — | — | — | — | $3.5 \times 10^{-3}$ | $3.5 \times 10^{-3}$ | $1.8 \times 10^{-3}$ |
| Number of Molecules of Guanidine in First Stage of Kneading (mol) | | | $4.7 \times 10^{-3}$ | $2.8 \times 10^{-3}$ | $4.3 \times 10^{-4}$ | $7.1 \times 10^{-3}$ | $1.4 \times 10^{-2}$ | $4.7 \times 10^{-3}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | | 132 | 126 | 120 | 128 | 123 | 121 | 120 | 124 |

| | | | Example | | | | | | Comparative Example |
|---|---|---|---|---|---|---|---|---|---|
| | | Part by mass | 85 | 86 | 87 | 88 | 89 | 90 | 46 |
| Formulation | First Stage of Kneading | Emulsion-Polymerized SBR *1 | 10 | 20 | 30 | 40 | 10 | 10 | 100 |
| | | Solution-Polymerized SBR *2 | 90 | 80 | 70 | 60 | 90 | 90 | — |
| | | Carbon Black N220 *3 | 10 | 10 | 10 | 10 | 10 | 10 | 10 |
| | | Silica *16 | 50 | 50 | 50 | 60 | 50 | 50 | 50 |
| | | Silane Coupling Agent Si75 *5 | 4.0 | 4.0 | 4.0 | 4.8 | 4.0 | 4.0 | 4.0 |
| | | Aromatic Oil | 30 | 30 | 30 | 30 | 30 | 30 | 30 |
| | | Stearic Acid | — | — | — | — | 0.5 | 0.7 | 2 |

TABLE 10-continued

|  |  |  |  |  |  |  |  |  |
|---|---|---|---|---|---|---|---|---|
|  |  | Antioxidant 6PPD *6 | — | — | — | — | — | — | 1 |
|  |  | 1,3-Diphenylguanidine *7 | 1 | 1 | 1.3 | 1.7 | 1 | 1 | — |
|  | Final Stage | Stearic Acid | 2 | 2 | 2 | 2 | 1.5 | 1.3 | — |
|  | of Kneading | Antioxidant 6PPD *6 | 1 | 1 | 1 | 1 | 1 | 1 | — |
|  |  | Antioxidant TMDQ *8 | 1 | 1 | 1 | 1 | 1 | 1 | 1 |
|  |  | Zinc Flower | 2.5 | 2.5 | 2.5 | 2.5 | 2.5 | 2.5 | 2.5 |
|  |  | 1,3-Diphenylguanidine *7 | 0.54 | 0.54 | 0.54 | 0.54 | 0.54 | 0.54 | 0.54 |
|  |  | Vulcanization Accelerator MBTS *9 | 0.9 | 0.9 | 0.9 | 0.9 | 0.9 | 0.9 | 0.9 |
|  |  | Vulcanization Accelerator TBBS *10 | 0.54 | 0.54 | 0.54 | 0.54 | 0.54 | 0.54 | 0.54 |
|  |  | Sulfur | 1.35 | 1.35 | 1.35 | 1.35 | 1.35 | 1.35 | 1.35 |
| Number of Molecules of Organic Acid Compound in First Stage of Kneading (mol) |  |  | $2.0 \times 10^{-3}$ | $4.0 \times 10^{-3}$ | $6.0 \times 10^{-3}$ | $7.9 \times 10^{-3}$ | $3.7 \times 10^{-3}$ | $4.4 \times 10^{-3}$ | $2.68 \times 10^{-2}$ |
| Number of Molecules of Guanidine in First Stage of Kneading (mol) |  |  | $4.7 \times 10^{-3}$ | $4.7 \times 10^{-3}$ | $6.2 \times 10^{-3}$ | $8.1 \times 10^{-3}$ | $4.7 \times 10^{-3}$ | $4.7 \times 10^{-3}$ | — |
| Number of Molecules of Silane Coupling Agent in First Stage of Kneading (mol) |  |  | $8.2 \times 10^{-3}$ | $8.2 \times 10^{-3}$ | $8.2 \times 10^{-3}$ | $9.8 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) |  | 124 | 122 | 119 | 118 | 122 | 122 | 100 |

|  |  |  | Comparative Example |  |  |  |  |  |  |
|---|---|---|---|---|---|---|---|---|---|
|  | Part by mass |  | 47 | 48 | 49 | 50 | 51 | 52 | 53 |
| Formulation | First Stage of Kneading | Emulsion-Polymerized SBR *1 | — | 100 | — | 50 | 75 | 50 | 75 |
|  |  | Solution-Polymerized SBR *2 | 100 | — | 100 | 50 | 25 | 50 | 25 |
|  |  | Carbon Black N220 *3 | 10 | 10 | 10 | 10 | 10 | 10 | 10 |
|  |  | Silica *16 | 50 | 50 | 50 | 50 | 50 | 50 | 50 |
|  |  | Silane Coupling Agent Si75 *5 | — | 4.0 | 4.0 | 4.0 | 4.0 | 4.0 | 4.0 |
|  |  | Aromatic Oil | 30 | 30 | 30 | 30 | 30 | 30 | 30 |
|  |  | Stearic Acid | 2 | 2 | 2 | 2 | 2 | — | — |
|  |  | Antioxidant 6PPD *6 | 1 | 1 | 1 | 1 | 1 | — | — |
|  |  | 1,3-Diphenylguanidine *7 | — | 1 | 1 | 1 | 1 | 1 | 1 |
|  | Final Stage of Kneading | Stearic Acid | — | — | — | — | — | 2 | 2 |
|  |  | Antioxidant 6PPD *6 | — | — | — | — | — | 1 | 1 |
|  |  | Antioxidant TMDQ *8 | 1 | 1 | 1 | 1 | 1 | 1 | 1 |
|  |  | Zinc Flower | 2.5 | 2.5 | 2.5 | 2.5 | 2.5 | 2.5 | 2.5 |
|  |  | 1,3-Diphenylguanidine *7 | 0.54 | 0.54 | 0.54 | 0.54 | 0.54 | 0.54 | 0.54 |
|  |  | Vulcanization Accelerator MBTS *9 | 0.9 | 0.9 | 0.9 | 0.9 | 0.9 | 0.9 | 0.9 |
|  |  | Vulcanization Accelerator TBBS *10 | 0.54 | 0.54 | 0.54 | 0.54 | 0.54 | 0.54 | 0.54 |
|  |  | Sulfur | 1.35 | 1.35 | 1.35 | 1.35 | 1.35 | 1.35 | 1.35 |
| Number of Molecules of Organic Acid Compound in First Stage of Kneading (mol) |  |  | $7.0 \times 10^{-3}$ | $2.68 \times 10^{-2}$ | $7.0 \times 10^{-3}$ | $1.70 \times 10^{-2}$ | $2.19 \times 10^{-2}$ | $9.9 \times 10^{-3}$ | $1.49 \times 10^{-2}$ |
| Number of Molecules of Guanidine in First Stage of Kneading (mol) |  |  | — | $4.7 \times 10^{-3}$ | $4.7 \times 10^{-3}$ | $4.7 \times 10^{-3}$ | $4.7 \times 10^{-3}$ | $4.7 \times 10^{-3}$ | $4.7 \times 10^{-3}$ |
| Number of Molecules of Silane Coupling Agent in First Stage of Kneading (mol) |  |  | — | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) |  | 100 | 110 | 112 | 110 | 109 | 111 | 110 |

[Notes]
*1 to *10 are all the same as in Table 1.
*16: Tosoh Silica's trade name "Nipsil KQ", BET specific surface area 240 m²/g

TABLE 11

|  |  |  | Example |  |  |  |  |  |  |
|---|---|---|---|---|---|---|---|---|---|
|  | Part by mass |  | 91 | 92 | 93 | 94 | 95 | 96 | 97 |
| Formulation | First Stage of Kneading | Emulsion-Polymerized SBR *1 | — | — | — | — | — | — | — |
|  |  | Solution-Polymerized SBR *2 | 100 | 100 | 100 | 100 | 100 | 100 | 100 |
|  |  | Carbon Black N220 *3 | 10 | 10 | 10 | 10 | 10 | 10 | 10 |
|  |  | Silica *17 | 50 | 50 | 50 | 50 | 50 | 50 | 50 |
|  |  | Silane Coupling Agent Si75 *5 | 4.0 | 4.0 | 4.0 | 4.0 | 4.0 | 4.0 | 4.0 |
|  |  | Aromatic Oil | 30 | 30 | 30 | 30 | 30 | 30 | 30 |
|  |  | Stearic Acid | — | — | — | — | — | 1 | 1 |

TABLE 11-continued

| | | | | | | | | |
|---|---|---|---|---|---|---|---|---|
| | | Antioxidant 6PPD *6 | — | — | — | — | — | 1 | — |
| | | 1,3-Diphenylguanidine *7 | 1 | 0.6 | 0.1 | 1.5 | 3 | 1 | 1 |
| | Final Stage | Stearic Acid | 2 | 2 | 2 | 2 | 2 | 1 | — |
| | of | Antioxidant 6PPD *6 | 1 | 1 | 1 | 1 | 1 | — | 1 |
| | Kneading | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | — | — | — | — | — | $3.5 \times 10^{-3}$ | $3.5 \times 10^{-3}$ |
| Number of Molecules of Guanidine in First Stage of Kneading (mol) | | | $4.7 \times 10^{-3}$ | $2.8 \times 10^{-3}$ | $4.3 \times 10^{-4}$ | $7.1 \times 10^{-3}$ | $1.4 \times 10^{-2}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | | 123 | 120 | 116 | 124 | 120 | 117 | 117 |

| | | | Example | | | | | | |
|---|---|---|---|---|---|---|---|---|---|
| | | Part by mass | 98 | 99 | 100 | 101 | 102 | 103 | 104 |
| Formulation | First Stage of Kneading | Emulsion-Polymerized SBR *1 | — | 10 | 20 | 30 | 40 | 10 | 10 |
| | | Solution-Polymerized SBR *2 | 100 | 90 | 80 | 70 | 60 | 90 | 90 |
| | | Carbon Black N220 *3 | 10 | 10 | 10 | 10 | 10 | 10 | 10 |
| | | Silica *17 | 50 | 50 | 50 | 50 | 60 | 50 | 50 |
| | | Silane Coupling Agent Si75 *5 | 4.0 | 4.0 | 4.0 | 4.0 | 4.8 | 4.0 | 4.0 |
| | | Aromatic Oil | 30 | 30 | 30 | 30 | 30 | 30 | 30 |
| | | Stearic Acid | 0.5 | — | — | — | — | 0.5 | 0.7 |
| | | Antioxidant 6PPD *6 | 1 | — | — | — | — | — | — |
| | | 1,3-Diphenylguanidine *7 | 1 | 1 | 1 | 1.3 | 1.7 | 1 | 1 |
| | Final Stage | Stearic Acid | 1.5 | 2 | 2 | 2 | 2 | 1.5 | 1.3 |
| | of | Antioxidant 6PPD *6 | — | 1 | 1 | 1 | 1 | 1 | 1 |
| | Kneading | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 |
| | | Vulcanization Accelerator TBBS *10 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | $1.8 \times 10^{-3}$ | $2.0 \times 10^{-3}$ | $4.0 \times 10^{-3}$ | $6.0 \times 10^{-3}$ | $7.9 \times 10^{-3}$ | $3.7 \times 10^{-3}$ | $4.4 \times 10^{-3}$ |
| Number of Molecules of Guanidine in First Stage of Kneading (mol) | | | $4.7 \times 10^{-3}$ | $4.7 \times 10^{-3}$ | $4.7 \times 10^{-3}$ | $6.2 \times 10^{-3}$ | $8.1 \times 10^{-3}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | $8.2 \times 10^{-3}$ | $8.2 \times 10^{-3}$ | $8.2 \times 10^{-3}$ | $9.8 \times 10^{-3}$ | $8.2 \times 10^{-3}$ | $8.2 \times 10^{-3}$ |
| Vulcanizate Physical Property | Low-Heat-Generation Property (tanδ index) | | 119 | 118 | 116 | 114 | 114 | 116 | 116 |

| | | | Comparative Example | | | | | | | |
|---|---|---|---|---|---|---|---|---|---|---|
| | | Part by mass | 54 | 55 | 56 | 57 | 58 | 59 | 60 | 61 |
| Formulation | First Stage of Kneading | Emulsion-Polymerized SBR *1 | 100 | — | 100 | — | 50 | 75 | 50 | 75 |
| | | Solution-Polymerized SBR *2 | — | 100 | — | 100 | 50 | 25 | 50 | 25 |
| | | Carbon Black N220 *3 | 10 | 10 | 10 | 10 | 10 | 10 | 10 | 10 |
| | | Silica *17 | 50 | 50 | 50 | 50 | 50 | 50 | 50 | 50 |
| | | Silane Coupling Agent Si75 *5 | 4.0 | — | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2 | 2 | 2 | 2 | 2 | 2 | — | — |
| | | Antioxidant 6PPD *6 | 1 | 1 | 1 | 1 | 1 | 1 | — | — |
| | | 1,3-Diphenylguanidine *7 | — | — | 1 | 1 | 1 | 1 | 1 | 1 |
| | Final Stage of Kneading | Stearic Acid | — | — | — | — | — | — | 2 | 2 |
| | | Antioxidant 6PPD *6 | — | — | — | — | — | — | 1 | 1 |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.6 | 0.6 | 0.6 | 0.6 | 0.6 | 0.6 | 0.6 | 0.6 |
| | | Vulcanization Accelerator MBTS *9 | 1 | 1 | 1 | 1 | 1 | 1 | 1 | 1 |

TABLE 11-continued

| | | | | | | | | | |
|---|---|---|---|---|---|---|---|---|---|
| | Vulcanization Accelerator TBBS *10 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 |
| Number of Molecules of Organic Acid Compound in First Stage of Kneading (mol) | | $2.68 \times 10^{-2}$ | $7.0 \times 10^{-3}$ | $2.68 \times 10^{-2}$ | $7.0 \times 10^{-3}$ | $1.70 \times 10^{-2}$ | $2.19 \times 10^{-2}$ | $9.9 \times 10^{-3}$ | $1.49 \times 10^{-2}$ |
| Number of Molecules of Guanidine in First Stage of Kneading (mol) | | — | — | $4.7 \times 10^{-3}$ | $4.7 \times 10^{-3}$ | $4.7 \times 10^{-3}$ | $4.7 \times 10^{-3}$ | $4.7 \times 10^{-3}$ | $4.7 \times 10^{-3}$ |
| Number of Molecules of Silane Coupling Agent in First Stage of Kneading (mol) | | $8.2 \times 10^{-3}$ | — | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | 100 | 100 | 108 | 110 | 109 | 109 | 110 | 109 |

[Notes]
*1 to *10 are all the same as in Table 1.
*17: Tosoh Silica's trade name "Nipsil NS", BET specific surface area 160 m²/g

TABLE 12

| | | | Example | | | | | | |
|---|---|---|---|---|---|---|---|---|---|
| | | Part by mass | 105 | 106 | 107 | 108 | 109 | 110 | 111 |
| Formulation | First Stage of Kneading | Emulsion-Polymerized SBR *1 | — | — | — | — | — | — | — |
| | | Solution-Polymerized SBR *2 | 100 | 100 | 100 | 100 | 100 | 100 | 100 |
| | | Carbon Black N220 *3 | 10 | 10 | 10 | 10 | 10 | 10 | 10 |
| | | Silica *18 | 50 | 50 | 50 | 50 | 50 | 50 | 50 |
| | | Silane Coupling Agent Si75 *5 | 4.0 | 4.0 | 4.0 | 4.0 | 4.0 | 4.0 | 4.0 |
| | | Aromatic Oil | 30 | 30 | 30 | 30 | 30 | 30 | 30 |
| | | Stearic Acid | — | — | — | — | — | 1 | 1 |
| | | Antioxidant 6PPD *6 | — | — | — | — | — | 1 | — |
| | | 1,3-Diphenylguanidine *7 | 1 | 0.6 | 0.1 | 1.5 | 3 | 1 | 1 |
| | Final Stage of Kneading | Stearic Acid | 2 | 2 | 2 | 2 | 2 | 1 | — |
| | | Antioxidant 6PPD *6 | 1 | 1 | 1 | 1 | 1 | — | 1 |
| | | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.72 | 0.72 | 0.72 | 0.72 | 0.72 | 0.72 | 0.72 |
| | | Vulcanization Accelerator MBTS *9 | 1.2 | 1.2 | 1.2 | 1.2 | 1.2 | 1.2 | 1.2 |
| | | Vulcanization Accelerator TBBS *10 | 0.72 | 0.72 | 0.72 | 0.72 | 0.72 | 0.72 | 0.72 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | — | — | — | — | — | $3.5 \times 10^{-3}$ | $3.5 \times 10^{-3}$ |
| Number of Molecules of Guanidine in First Stage of Kneading (mol) | | | $4.7 \times 10^{-3}$ | $2.8 \times 10^{-3}$ | $4.3 \times 10^{-4}$ | $7.1 \times 10^{-3}$ | $1.4 \times 10^{-2}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | | 116 | 115 | 112 | 116 | 114 | 114 | 114 |

| | | | Example | | | | | | |
|---|---|---|---|---|---|---|---|---|---|
| | | Part by mass | 112 | 113 | 114 | 115 | 116 | 117 | 118 |
| Formulation | First Stage of Kneading | Emulsion-Polymerized SBR *1 | — | 10 | 20 | 30 | 40 | 10 | 10 |
| | | Solution-Polymerized SBR *2 | 100 | 90 | 80 | 70 | 60 | 90 | 90 |
| | | Carbon Black N220 *3 | 10 | 10 | 10 | 10 | 10 | 10 | 10 |
| | | Silica *18 | 50 | 50 | 50 | 50 | 60 | 50 | 50 |
| | | Silane Coupling Agent Si75 *5 | 4.0 | 4.0 | 4.0 | 4.0 | 4.8 | 4.0 | 4.0 |
| | | Aromatic Oil | 30 | 30 | 30 | 30 | 30 | 30 | 30 |
| | | Stearic Acid | 0.5 | — | — | — | — | 0.5 | 0.7 |
| | | Antioxidant 6PPD *6 | 1 | — | — | — | — | — | — |
| | | 1,3-Diphenylguanidine *7 | 1 | 1 | 1 | 1.3 | 1.7 | 1 | 1 |
| | Final Stage of Kneading | Stearic Acid | 1.5 | 2 | 2 | 2 | 2 | 1.5 | 1.3 |
| | | Antioxidant 6PPD *6 | — | 1 | 1 | 1 | 1 | 1 | 1 |
| | | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.72 | 0.72 | 0.72 | 0.72 | 0.72 | 0.72 | 0.72 |
| | | Vulcanization Accelerator MBTS *9 | 1.2 | 1.2 | 1.2 | 1.2 | 1.2 | 1.2 | 1.2 |
| | | Vulcanization Accelerator TBBS *10 | 0.72 | 0.72 | 0.72 | 0.72 | 0.72 | 0.72 | 0.72 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | $1.8 \times 10^{-3}$ | $2.0 \times 10^{-3}$ | $4.0 \times 10^{-3}$ | $6.0 \times 10^{-3}$ | $7.9 \times 10^{-3}$ | $3.7 \times 10^{-3}$ | $4.4 \times 10^{-3}$ |

TABLE 12-continued

| | | | | | | | | |
|---|---|---|---|---|---|---|---|---|
| Number of Molecules of Guanidine in First Stage of Kneading (mol) | | $4.7 \times 10^{-3}$ | $4.7 \times 10^{-3}$ | $4.7 \times 10^{-3}$ | $6.2 \times 10^{-3}$ | $8.1 \times 10^{-3}$ | $4.7 \times 10^{-3}$ | $4.7 \times 10^{-3}$ |
| Number of Molecules of Silane Coupling Agent in First Stage of Kneading (mol) | | $8.2 \times 10^{-3}$ | $8.2 \times 10^{-3}$ | $8.2 \times 10^{-3}$ | $8.2 \times 10^{-3}$ | $9.8 \times 10^{-3}$ | $8.2 \times 10^{-3}$ | $8.2 \times 10^{-3}$ |
| Vulcanizate Physical Property | Low-Heat-Generation Property (tanδ index) | 115 | 112 | 111 | 110 | 110 | 111 | 111 |

| | | | Comparative Example | | | | | | |
|---|---|---|---|---|---|---|---|---|---|
| | Part by mass | | 62 | 63 | 64 | 65 | 66 | 67 | 68 | 69 |
| Formulation | First Stage of Kneading | Emulsion-Polymerized SBR *1 | 100 | — | 100 | — | 50 | 75 | 50 | 75 |
| | | Solution-Polymerized SBR *2 | — | 100 | — | 100 | 50 | 25 | 50 | 25 |
| | | Carbon Black N220 *3 | 10 | 10 | 10 | 10 | 10 | 10 | 10 | 10 |
| | | Silica *18 | 50 | 50 | 50 | 50 | 50 | 50 | 50 | 50 |
| | | Silane Coupling Agent Si75 *5 | 4.0 | — | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2 | 2 | 2 | 2 | 2 | 2 | — | — |
| | | Antioxidant 6PPD *6 | 1 | 1 | 1 | 1 | 1 | 1 | — | — |
| | | 1,3-Diphenylguanidine *7 | — | — | 1 | 1 | 1 | 1 | 1 | 1 |
| | Final Stage of Kneading | Stearic Acid | — | — | — | — | — | — | 2 | 2 |
| | | Antioxidant 6PPD *6 | — | — | — | — | — | — | 1 | 1 |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.72 | 0.72 | 0.72 | 0.72 | 0.72 | 0.72 | 0.72 | 0.72 |
| | | Vulcanization Accelerator MBTS *9 | 1.2 | 1.2 | 1.2 | 1.2 | 1.2 | 1.2 | 1.2 | 1.2 |
| | | Vulcanization Accelerator TBBS *10 | 0.72 | 0.72 | 0.72 | 0.72 | 0.72 | 0.72 | 0.72 | 0.72 |
| | | Sulfur | 1.5 | 1.5 | 1.5 | 1.5 | 1.5 | 1.5 | 1.5 | 1.5 |
| Number of Molecules of Organic Acid Compound in First Stage of Kneading (mol) | | | $2.68 \times 10^{-2}$ | $7.0 \times 10^{-3}$ | $2.68 \times 10^{-2}$ | $7.0 \times 10^{-3}$ | $1.70 \times 10^{-2}$ | $2.19 \times 10^{-2}$ | $9.9 \times 10^{-3}$ | $1.49 \times 10^{-2}$ |
| Number of Molecules of Guanidine in First Stage of Kneading (mol) | | | — | — | $4.7 \times 10^{-3}$ | $4.7 \times 10^{-3}$ | $4.7 \times 10^{-3}$ | $4.7 \times 10^{-3}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | — | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | | 100 | 100 | 106 | 107 | 106 | 106 | 107 | 106 |

[Notes]
*1 to *10 are all the same as in Table 1.
*18: Tosoh Silica's trade name "Nipsil NA", BET specific surface area 135 m²/g

TABLE 13

| | | | Example | | | | | | |
|---|---|---|---|---|---|---|---|---|---|
| | Part by mass | | 119 | 120 | 121 | 122 | 123 | 124 | 125 |
| Formulation | First Stage of Kneading | Emulsion-Polymerized SBR *1 | — | — | — | — | — | — | — |
| | | Solution-Polymerized SBR *2 | 100 | 100 | 100 | 100 | 100 | 100 | 100 |
| | | Carbon Black N220 *3 | 10 | 10 | 10 | 10 | 10 | 10 | 10 |
| | | Silica *19 | 50 | 50 | 50 | 50 | 50 | 50 | 50 |
| | | Silane Coupling Agent Si75 *5 | 4.0 | 4.0 | 4.0 | 4.0 | 4.0 | 4.0 | 4.0 |
| | | Aromatic Oil | 30 | 30 | 30 | 30 | 30 | 30 | 30 |
| | | Stearic Acid | — | — | — | — | — | 1 | 1 |
| | | Antioxidant 6PPD *6 | — | — | — | — | — | 1 | — |
| | | 1,3-Diphenylguanidine *7 | 1 | 0.6 | 0.1 | 1.5 | 3 | 1 | 1 |
| | Final Stage of Kneading | Stearic Acid | 2 | 2 | 2 | 2 | 2 | 1 | — |
| | | Antioxidant 6PPD *6 | 1 | 1 | 1 | 1 | 1 | — | 1 |
| | | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.78 | 0.78 | 0.78 | 0.78 | 0.78 | 0.78 | 0.78 |
| | | Vulcanization Accelerator MBTS *9 | 1.3 | 1.3 | 1.3 | 1.3 | 1.3 | 1.3 | 1.3 |
| | | Vulcanization Accelerator TBBS *10 | 0.78 | 0.78 | 0.78 | 0.78 | 0.78 | 0.78 | 0.78 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | — | — | — | — | — | $3.5 \times 10^{-3}$ | $3.5 \times 10^{-3}$ |

TABLE 13-continued

| | | | | | | | | |
|---|---|---|---|---|---|---|---|---|
| Number of Molecules of Guanidine in First Stage of Kneading (mol) | | $4.7 \times 10^{-3}$ | $2.8 \times 10^{-3}$ | $4.3 \times 10^{-4}$ | $7.1 \times 10^{-3}$ | $1.4 \times 10^{-2}$ | $4.7 \times 10^{-3}$ | $4.7 \times 10^{-3}$ |
| Number of Molecules of Silane Coupling Agent in First Stage of Kneading (mol) | | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |
| Vulcanizate Physical Property | Low-Heat-Generation Property (tanδ index) | 110 | 109 | 107 | 111 | 111 | 108 | 108 |

| | | | Example | | | | | | |
|---|---|---|---|---|---|---|---|---|---|
| | Part by mass | | 126 | 127 | 128 | 129 | 130 | 131 | 132 |
| Formulation | First Stage of Kneading | Emulsion-Polymerized SBR *1 | — | 10 | 20 | 30 | 40 | 10 | 10 |
| | | Solution-Polymerized SBR *2 | 100 | 90 | 80 | 70 | 60 | 90 | 90 |
| | | Carbon Black N220 *3 | 10 | 10 | 10 | 10 | 10 | 10 | 10 |
| | | Silica *19 | 50 | 50 | 50 | 50 | 60 | 50 | 50 |
| | | Silane Coupling Agent Si75 *5 | 4.0 | 4.0 | 4.0 | 4.0 | 4.8 | 4.0 | 4.0 |
| | | Aromatic Oil | 30 | 30 | 30 | 30 | 30 | 30 | 30 |
| | | Stearic Acid | 0.5 | — | — | — | — | 0.5 | 0.7 |
| | | Antioxidant 6PPD *6 | 1 | — | — | — | — | — | — |
| | | 1,3-Diphenylguanidine *7 | 1 | 1 | 1 | 1.3 | 1.7 | 1 | 1 |
| | Final Stage of Kneading | Stearic Acid | 1.5 | 2 | 2 | 2 | 2 | 1.5 | 1.3 |
| | | Antioxidant 6PPD *6 | — | 1 | 1 | 1 | 1 | 1 | 1 |
| | | Antioxidant TMDQ *8 | 1 | 1 | 1 | 1 | 1 | 1 | 1 |
| | | Zinc Flower | 2.5 | 2.5 | 2.5 | 2.5 | 2.5 | 2.5 | 2.5 |
| | | 1,3-Diphenylguanidine *7 | 0.78 | 0.78 | 0.78 | 0.78 | 0.78 | 0.78 | 0.78 |
| | | Vulcanization Accelerator MBTS *9 | 1.3 | 1.3 | 1.3 | 1.3 | 1.3 | 1.3 | 1.3 |
| | | Vulcanization Accelerator TBBS *10 | 0.78 | 0.78 | 0.78 | 0.78 | 0.78 | 0.78 | 0.78 |
| | | Sulfur | 1.5 | 1.5 | 1.5 | 1.5 | 1.5 | 1.5 | 1.5 |
| Number of Molecules of Organic Acid Compound in First Stage of Kneading (mol) | | | $1.8 \times 10^{-3}$ | $2.0 \times 10^{-3}$ | $4.0 \times 10^{-3}$ | $6.0 \times 10^{-3}$ | $7.9 \times 10^{-3}$ | $3.7 \times 10^{-3}$ | $4.4 \times 10^{-3}$ |
| Number of Molecules of Guanidine in First Stage of Kneading (mol) | | | $4.7 \times 10^{-3}$ | $4.7 \times 10^{-3}$ | $4.7 \times 10^{-3}$ | $6.2 \times 10^{-3}$ | $8.1 \times 10^{-3}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | $8.2 \times 10^{-3}$ | $8.2 \times 10^{-3}$ | $8.2 \times 10^{-3}$ | $9.8 \times 10^{-3}$ | $8.2 \times 10^{-3}$ | $8.2 \times 10^{-3}$ |
| Vulcanizate Physical Property | Low-Heat-Generation Property (tanδ index) | | 109 | 109 | 108 | 107 | 107 | 108 | 108 |

| | | | Comparative Example | | | | | | | |
|---|---|---|---|---|---|---|---|---|---|---|
| | Part by mass | | 70 | 71 | 72 | 73 | 74 | 75 | 76 | 77 |
| Formulation | First Stage of Kneading | Emulsion-Polymerized SBR *1 | 100 | — | 100 | — | 50 | 75 | 50 | 75 |
| | | Solution-Polymerized SBR *2 | — | 100 | — | 100 | 50 | 25 | 50 | 25 |
| | | Carbon Black N220 *3 | 10 | 10 | 10 | 10 | 10 | 10 | 10 | 10 |
| | | Silica *19 | 50 | 50 | 50 | 50 | 50 | 50 | 50 | 50 |
| | | Silane Coupling Agent Si75 *5 | 4.0 | — | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2 | 2 | 2 | 2 | 2 | 2 | — | — |
| | | Antioxidant 6PPD *6 | 1 | 1 | 1 | 1 | 1 | 1 | — | — |
| | | 1,3-Diphenylguanidine *7 | — | — | 1 | 1 | 1 | 1 | 1 | 1 |
| | Final Stage of Kneading | Stearic Acid | — | — | — | — | — | — | 2 | 2 |
| | | Antioxidant 6PPD *6 | — | — | — | — | — | — | 1 | 1 |
| | | Antioxidant TMDQ *8 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 |
| | | 1,3-Diphenylguanidine *7 | 0.78 | 0.78 | 0.78 | 0.78 | 0.78 | 0.78 | 0.78 | 0.78 |
| | | Vulcanization Accelerator MBTS *9 | 1.3 | 1.3 | 1.3 | 1.3 | 1.3 | 1.3 | 1.3 | 1.3 |
| | | Vulcanization Accelerator TBBS *10 | 0.78 | 0.78 | 0.78 | 0.78 | 0.78 | 0.78 | 0.78 | 0.78 |
| | | Sulfur | 1.5 | 1.5 | 1.5 | 1.5 | 1.5 | 1.5 | 1.5 | 1.5 |
| Number of Molecules of Organic Acid Compound in First Stage of Kneading (mol) | | | $2.68 \times 10^{-2}$ | $7.0 \times 10^{-3}$ | $2.68 \times 10^{-2}$ | $7.0 \times 10^{-3}$ | $1.70 \times 10^{-2}$ | $2.19 \times 10^{-2}$ | $9.9 \times 10^{-3}$ | $1.49 \times 10^{-2}$ |
| Number of Molecules of Guanidine in First Stage of Kneading (mol) | | | — | — | $4.7 \times 10^{-3}$ | $4.7 \times 10^{-3}$ | $4.7 \times 10^{-3}$ | $4.7 \times 10^{-3}$ | $4.7 \times 10^{-3}$ | $4.7 \times 10^{-3}$ |
| Number of Molecules of Silane Coupling Agent in First Stage of Kneading (mol) | | | $8.2 \times 10^{-3}$ | — | $8.2 \times 10^{-3}$ | $8.2 \times 10^{-3}$ | $8.2 \times 10^{-3}$ | $8.2 \times 10^{-3}$ | $8.2 \times 10^{-3}$ | $8.2 \times 10^{-3}$ |

TABLE 13-continued

| Vulcanizate Physical Property | Low-Heat-Generation Property (tanδ index) | 100 | 100 | 104 | 105 | 104 | 104 | 105 | 104 |
|---|---|---|---|---|---|---|---|---|---|

[Notes]
*1 to *10 are all the same as in Table 1.
*19: Tosoh Silica's trade name "Nipsil ER", BET specific surface area 95 m²/g As obvious from Table 1 to Table 13 and FIG. 1, the rubber compositions of Examples 1 to 132 are all better than the comparative rubber compositions of Comparative Examples 1 to 77 in point of the low-heat-generation property (tan δ index).

INDUSTRIAL APPLICABILITY

According to the production method for a rubber composition of the present invention, it is possible to obtain a rubber composition excellent in low-heat-generation property with successfully inhibiting the coupling function activity of the silane coupling agent used from lowering and with further increasing the coupling function activity thereof, and is therefore favorably used as a production method for constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:

1. A method for producing a rubber composition containing a rubber component (A) of at least one selected from natural rubbers and emulsion-polymerized dienic rubbers, a filler containing an inorganic filler (B), a silane coupling agent (C), at least one vulcanization accelerator (D) selected from guanidines, sulfenamides and thiazoles, and an organic acid compound (E) including the organic acid compound contained in the rubber component (A), wherein the rubber composition is kneaded in plural stages, the rubber component (A), all or a part of the inorganic filler (B), all or a part of the silane coupling agent (C), the vulcanization accelerator (D) and the organic acid compound (E) are kneaded in the first stage of kneading, and the number of molecules X of the organic acid compound (E) in the rubber composition in the first stage is in a relation of the following formula [1] relative to the number of molecules Y of the vulcanization accelerator (D) therein:

$$0 \leq X \leq 1.5 \times Y \qquad [1].$$

2. The method for producing a rubber composition according to claim 1, wherein the highest temperature of the rubber composition in the first stage is from 120 to 190° C.

3. The method for producing a rubber composition according to claim 1, wherein the silane coupling agent (C) is at least one compound selected from a group consisting of compounds represented by the following general formulae (I) and (II):

[Chemical Formula 1]

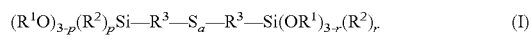
$$(R^1O)_{3-p}(R^2)_p Si—R^3—S_a—R^3—Si(OR^1)_{3-r}(R^2)_r \qquad (I)$$

[wherein, plural R¹'s may be the same or different, each representing a linear, cyclic or branched alkyl group having from 1 to 8 carbon atoms, a linear or branched alkoxylalkyl group having from 2 to 8 carbon atoms, or a hydrogen atom; plural R²'s may be the same or different, each representing a linear, cyclic or branched alkyl group having from 1 to 8 carbon atoms; plural R³'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time];

[Chemical Formula 2]

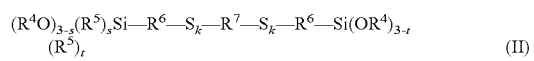
$$(R^4O)_{3-s}(R^5)_s Si—R^6—S_k—R^7—S_k—R^6—Si(OR^4)_{3-t}(R^5)_t \qquad (II)$$

[wherein plural R⁴'s may be the same or different, each representing a linear, cyclic or branched alkyl group having from 1 to 8 carbon atoms, a linear or branched alkoxylalkyl group having from 2 to 8 carbon atoms, or a hydrogen atom; plural R⁵'s may be the same or different, each representing a linear, cyclic or branched alkyl group having from 1 to 8 carbon atoms; plural R⁶'s may be the same or different, each representing a linear or branched alkylene group having from 1 to 8 carbon atoms; R⁷ represents a divalent group of a general formula (—S—R⁸—S—), (—R⁹—S_{m1}—R¹⁰) or (—R¹¹—S_{m2}—R¹²—S_{m3}—R¹³—) (where R⁸ to R¹³ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); plural k's may be the same or different, each indicating from 1 to 6 as a mean value; s and t each indicate from 0 to 3 as a mean value, provided that both s and t are not 3 at the same time].

4. The method for producing a rubber composition according to claim 3, the silane coupling agent (C) is a compound represented by the general formula (I).

5. The method for producing a rubber composition according to claim 1, wherein the inorganic filler (B) is silica.

6. The method for producing a rubber composition according to claim 1, wherein the inorganic filler (B) accounts for at least 30% by mass of the filler.

7. The method for producing a rubber composition according to claim 1, wherein the number of molecules of the vulcanization accelerator (D) in the rubber composition in the first stage of kneading is from 0.1 to 1.0 time the number of molecules of the silane coupling agent (C) therein.

8. The method for producing a rubber composition according to claim 1, wherein the guanidine is at least one compound selected from 1,3-diphenylguanidine, 1,3-di-o-tolylguanidine and 1-o-tolylbiguanide.

9. The method for producing a rubber composition according to claim 1, wherein the sulfenamide is at least one compound selected from N-cyclohexyl-2-benzothiazolylsulfenamide and N-tert-butyl-2-benzothiazolylsulfenamide.

10. The method for producing a rubber composition according to claim 1, wherein the thiazol is at least one compound selected from 2-mercaptobenzothiazole and di-2-benzothiazolyl disulfide.

11. The method for producing a rubber composition according to claim 1, wherein at least 50 mol % of the organic acid compound in the rubber composition in the first stage of kneading is stearic acid.

12. The method for producing a rubber composition according to claim 1, wherein the rubber component (A) contains at least one selected from emulsion-polymerized styrene-butadiene copolymer and natural rubber, and at least 50 mol % of the organic acid compound contained in the rubber composition in the first stage of kneading is at least one compound selected from rosin acids and fatty acids contained in at least one selected from the emulsion-polymerized styrene butadiene copolymer and the natural rubber.

13. The method for producing a rubber composition according to claim 1, wherein in the first stage, the rubber component (A), all or a part of the inorganic filler (B) and all or a part of the silane coupling agent (C) are kneaded, and then the vulcanization accelerator (D) is added thereto and further kneaded.

14. A method for producing a rubber composition containing solution-polymerized dienic rubbers as the sole rubber component (A), a filler containing an inorganic filler (B), a silane coupling agent (C), at least one vulcanization accelerator (D) selected from guanidines, sulfenamides and thiazoles, and optionally an organic acid compound (E), wherein the rubber composition is kneaded in plural stages, the rubber component (A), all or a part of the inorganic filler (B), all or a part of the silane coupling agent (C) and the vulcanization accelerator (D) are kneaded in the first stage of kneading, and the number of molecules X of the organic acid compound (E) in the rubber composition in the first stage is in a relation of the following formula [1] relative to the number of molecules Y of the vulcanization accelerator (D) therein:

$$0 \leq X \leq (3.5/4.7) \times Y \quad [1],$$

provided that Y is not 0.

15. The method for producing a rubber composition according to claim 14, wherein the highest temperature of the rubber composition in the first stage is from 120 to 190° C.

16. The method for producing a rubber composition according to claim 14, wherein the silane coupling agent (C) is at least one compound selected from a group consisting of compounds represented by the following general formulae (I) and (II):

[Chemical Formula 1]

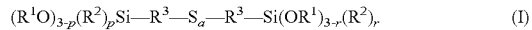
(R$^1$O)$_{3-p}$(R$^2$)$_p$Si—R$^3$—S$_a$—R$^3$—Si(OR$^1$)$_{3-r}$(R$^2$)$_r$ (I)

[wherein, plural R$^1$'s may be the same or different, each representing a linear, cyclic or branched alkyl group having from 1 to 8 carbon atoms, a linear or branched alkoxylalkyl group having from 2 to 8 carbon atoms, or a hydrogen atom; plural R$^2$'s may be the same or different, each representing a linear, cyclic or branched alkyl group having from 1 to 8 carbon atoms; plural R$^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time];

[Chemical Formula 2]

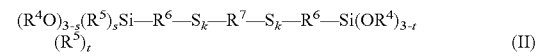
(R$^4$O)$_{3-s}$(R$^5$)$_s$Si—R$^6$—S$_k$—R$^7$—S$_k$—R$^6$—Si(OR$^4$)$_{3-t}$(R$^5$)$_t$ (II)

[wherein plural R$^4$'s may be the same or different, each representing a linear, cyclic or branched alkyl group having from 1 to 8 carbon atoms, a linear or branched alkoxylalkyl group having from 2 to 8 carbon atoms, or a hydrogen atom; plural R$^5$'s may be the same or different, each representing a linear, cyclic or branched alkyl group having from 1 to 8 carbon atoms; plural R$^6$'s may be the same or different, each representing a linear or branched alkylene group having from 1 to 8 carbon atoms; R$^7$ represents a divalent group of a general formula (—S—R$^8$—S—), (—R$^9$—S$_{m1}$—R$^{10}$) or (—R$^{11}$S$_{m2}$—R$^{12}$—S$_{m3}$—R$^{13}$—) (where R$^8$ to R$^{13}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); plural k's may be the same or different, each indicating from 1 to 6 as a mean value; s and t each indicate from 0 to 3 as a mean value, provided that both s and t are not 3 at the same time].

17. The method for producing a rubber composition according to claim 16, the silane coupling agent (C) is a compound represented by the general formula (I).

18. The method for producing a rubber composition according to claim 14, wherein the inorganic filler (B) is silica.

19. The method for producing a rubber composition according to claim 14, wherein in the first stage, the rubber component (A), all or a part of the inorganic filler (B) and all or a part of the silane coupling agent (C) are kneaded, and then the vulcanization accelerator (D) is added thereto and further kneaded.

* * * * *